US009237305B2

(12) United States Patent
Guzman et al.

(10) Patent No.: US 9,237,305 B2
(45) Date of Patent: Jan. 12, 2016

(54) OVERLAY FOR A VIDEO CONFERENCING APPLICATION

(75) Inventors: Angela Guzman, San Jose, CA (US); Patrick Coffman, San Francisco, CA (US); Stephen O. Lemay, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 1096 days.

(21) Appl. No.: 12/906,920

(22) Filed: Oct. 18, 2010

(65) Prior Publication Data

US 2012/0092438 A1    Apr. 19, 2012

(51) Int. Cl.
*H04N 7/14* (2006.01)
*H04N 7/15* (2006.01)

(52) U.S. Cl.
CPC ..................................... *H04N 7/15* (2013.01)

(58) Field of Classification Search
CPC ............ G06F 3/048; G06F 15/16; H04N 7/15
USPC ............................................ 348/14.03, 14.07
See application file for complete search history.

(56) References Cited

U.S. PATENT DOCUMENTS

| 5,594,859 | A | 1/1997 | Palmer et al. |
| 6,025,871 | A | 2/2000 | Kantor et al. |
| 6,496,201 | B1 | 12/2002 | Baldwin et al. |
| 7,133,062 | B2 | 11/2006 | Castles et al. |
| 7,839,434 | B2 * | 11/2010 | Ciudad et al. ............ 348/211.12 |
| 8,194,117 | B2 * | 6/2012 | Hetherington et al. ..... 348/14.12 |
| 2002/0069411 | A1 * | 6/2002 | Rainville et al. ................. 725/37 |
| 2006/0023062 | A1 * | 2/2006 | Elbaze et al. ............... 348/14.09 |
| 2008/0034038 | A1 * | 2/2008 | Ciudad et al. ................. 709/204 |
| 2008/0320419 | A1 * | 12/2008 | Matas et al. ................... 715/863 |
| 2009/0077124 | A1 * | 3/2009 | Spivack et al. ............ 707/103 Y |
| 2010/0325211 | A1 * | 12/2010 | Ylinen et al. .................. 709/205 |
| 2011/0234746 | A1 * | 9/2011 | Saleh et al. ................. 348/14.03 |
| 2011/0249086 | A1 * | 10/2011 | Guo et al. .................. 348/14.12 |
| 2012/0062688 | A1 * | 3/2012 | Shen et al. .................. 348/14.03 |

FOREIGN PATENT DOCUMENTS

WO    WO 2009/083885 A1 *  7/2009  ............ G06T 15/503

* cited by examiner

*Primary Examiner* — Sonia Gay
(74) *Attorney, Agent, or Firm* — Adeli LLP

(57) ABSTRACT

Some embodiments provide a video conferencing application for execution by a first electronic device. The video conferencing application is for conducting a video conference between the first electronic device and a second electronic device. The video conferencing application presents, in a first display area, a video captured by the first electronic device. In an at least partially transparent second display area that is superimposed on a portion of the video in the first display area, the video conferencing application presents a set of user selectable items for configuring the video conferencing application.

20 Claims, 22 Drawing Sheets

OVERLAY FOR A VIDEO CONFERENCING APPLICATION

BACKGROUND

Many of today's computing devices, such as desktop computers, personal computers, and mobile phones, allow users to engage in video conferences with each other. In addition to being able to type out conversations with each other or hear each other talk, users can also see each other during the conversation, thereby coming closer to mimicking an in-person conversation. Due to a lack of screen real estate, it can be difficult to adequately display video(s) for the video conference along with any additional information that is needed to facilitate the video conference.

BRIEF SUMMARY

Some embodiments of the invention provide a graphical user interface (GUI) for a video conferencing application that includes an overlay display area superimposed over a video display area. In some embodiments, the video display area and the overlay display area are part of a composite display area of the GUI in which multiple display areas can be displayed. The video display area of some embodiments displays video images (e.g., frames or fields of video) for a video conference. The overlay display area of some embodiments displays information for configuring the video conferencing application (e.g., setup information, contact lists, editing options, etc.). Furthermore, the overlay display area of some embodiments is semi-transparent such that when superimposed over a portion of the video display area, the portion of the video displayed beneath the overlay display area remains partially visible.

As mentioned, the overlay display area displays a variety of data related to the configuration of the video conferencing application. This data may include a list of contacts retrieved from an address book of the user of the video conferencing application. Some embodiments may display a full list of contacts, a list of the user's favorite contacts, or a list of recently contacted contacts in the overlay display area.

Some embodiments represent each contact with a selectable user interface (UI) item that may be used to initiate a video conference. The user may select a selectable item representing a particular contact from the overlay display area in order to initiate a video conference with the particular contact. At this point, some embodiments send a video conference request to a device (e.g., specified by a phone number, e-mail address, or other identifying information) associated with the particular contact in order to begin the video conference. The particular contact can then accept or decline the request, or not respond. When the contact accepts the video conference request, a video conferencing session will begin.

In addition, the different lists of contacts may be modified through the overlay display area. For instance, the user can add contacts to the favorites list or remove contacts from the favorites list in some embodiments. The user can also modify information about a contact through the overlay display area.

Information beyond groups of contacts may be displayed in the overlay display area of some embodiments. As one example, the video conferencing application of some embodiments presents login and setup information to the user through the overlay display area. The initial setup of a user account, as well as later logins using the account, uses the overlay display area in some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details, examples and embodiments are set forth for purpose of explanation. However, one of ordinary skill in the art will realize that the invention is not limited to the embodiments set forth and that the invention may be practiced without some of the specific details and examples discussed. In other instances, well-known structures and devices are shown in block diagram form in order not to obscure the description of the invention with unnecessary detail.

Some embodiments of the invention provide a graphical user interface (GUI) for a video conferencing application that includes an overlay display area superimposed over a video display area. In some embodiments, the video display area and the overlay display area are part of a composite display area of the GUI in which multiple display areas can be displayed. The overlay display area of some embodiments displays information for configuring the video conferencing application (e.g., setup information, contact lists, editing options, etc.). Furthermore, the overlay display area of some embodiments is translucent such that when superimposed over a portion of the video display area, the portion of the video displayed beneath the overlay display area remains partially visible.

The video conferencing application of some embodiments is an application that operates on an electronic device (e.g., desktop computer, laptop computer, tablet computer, smartphone, media player, personal digital assistant, etc.) and enables a user of the device to engage in a video conference with a remote user of a second electronic device that also includes a video conferencing application. In a video conference, the local user is able to both view video (i.e., a sequence of images such as frames or fields) and listen to audio captured at the device of the remote user, and vice versa. In some embodiments, the video conference may include more than two users.

Figure 1:
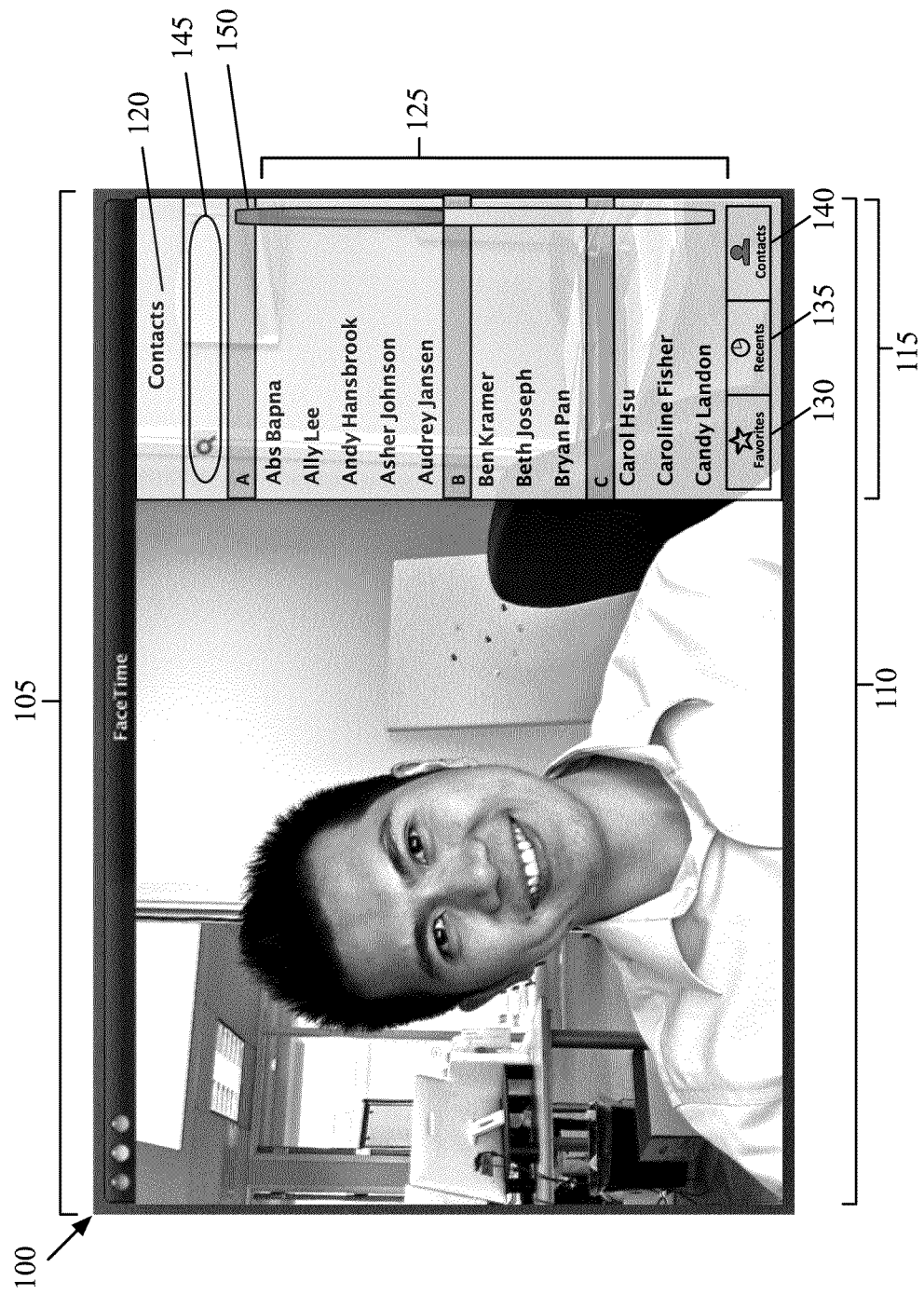
FIG. 1 conceptually illustrates a GUI of some embodiments of a video conferencing application that includes an overlay display area superimposed over a video display area.

FIG. 1 illustrates a GUI 100 of some embodiments of such a video conferencing application. The GUI 100 includes a composite display area 105 that displays a local video display area 110 and an overlay display area 115. The composite display area 105 may occupy the entire display screen of a display device on which it is displayed or only a portion of the display device.

The local video display area 110 displays video captured locally at the device on which the video conferencing application operates. The video may be captured by a camera that is part of the device or that is communicatively coupled to the device (e.g., via a Bluetooth connection, a USB connection, a Firewire connection, etc.). In this example, the local video display area displays a video image of a man whose images are being captured by a local camera.

The overlay display area 115 is for displaying a variety of data related to the configuration of the video conferencing application. As shown, the overlay display area 115 of some embodiments is a semi-transparent display area superimposed over a portion of the local video display area 110 at the right side of composite display area 105. Some embodiments allow for different levels of transparency of the overlay display area, ranging from opaque to completely transparent. Furthermore, in some embodiments, a blur is applied to the portion of the video displayed beneath the overlay display area, thereby creating a visual effect of a blurred video image.

In some embodiments, a user can move the overlay display area to occupy different regions of the composite display area (and thus be superimposed over different portions of the video display area), or resize the overlay display area to occupy a smaller or larger portion of the composite display area. In some embodiments, the overlay display area may also be superimposed over a remote video display area that displays video of a remote participant in a video conference, or over a video display that includes multiple video display areas (e.g., a picture-in-picture display of local and remote video, video displays shown side-by-side, etc.).

In FIG. 1, the overlay display area displays a description section 120, a list of selectable user interface (UI) items 125 representing contacts retrieved an address book, three selectable items 130, 135, and 140 representing different lists of contacts, and a search box 145. The description section 120 indicates to the user a description of the information presented in the overlay display area 115 (a contacts list, in this case). The selectable UI items 130, 135, and 140 enable the user to choose from among a full list of the user's contacts (with item 140), a list of favorite contacts (with item 130), or a list of recently contacted contacts (with item 135).

The selectable UI items 125 that represent contacts may be selected to initiate a video conference in some embodiments. The user may select a selectable item representing a particular contact from the overlay display area in order to initiate a video conference with the particular contact. At this point, some embodiments send a video conference request to a device (e.g., specified by a phone number, e-mail address, or other identifying information) associated with the particular contact in order to begin the video conference. The particular contact can then accept or decline the request, or not respond. When the contact accepts the video conference request, a video conferencing session begins.

The search box 145 enables the user to search for a particular contact in the displayed list. Sometimes, the list of contacts may be too long to fit into the overlay display area. In some embodiments, a scroll bar 150 is displayed to enable the user to scroll through the list of contacts to find a particular contact. As shown, some embodiments provide a search box 145 into which the user inputs information (e.g., first name, last name, date of birth, other personal information, etc.) that narrows down the list of contacts. The user may then select the desired contact from the displayed set of contacts. For instance, the user may input the letter "D", which causes the video conferencing application to display any contacts in the list that start with the letter "D".

The contacts list shown in FIG. 1 is only one example of information that may be displayed in the overlay display area of some embodiments. In addition to the full contacts list, other subsets of contacts may be displayed. For example, the user may set up a list of favorite contacts and view only these contacts when selectable item 130 is selected. The user may also view the contacts with whom the user has been in contact most recently by selecting selectable item 135.

In addition, some of these sub-lists may be modified through the overlay display area. For instance, the user can add contacts to the favorites list or remove contacts from the favorites list in some embodiments. The user can also modify information about a contact through the overlay display area. For instance, the user can view a contact's profile upon selection of a selectable item representing the contact and then edit/modify the contact's information (e.g., phone number, address, e-mail address, etc.).

Furthermore, information beyond groups of contacts may be displayed in the overlay display area of some embodiments. As one example, the video conferencing application of some embodiments presents login and setup information to the user through the overlay display area. The initial setup of a user account, as well as later logins using the account, uses the overlay display area in some embodiments.

Figure 2:
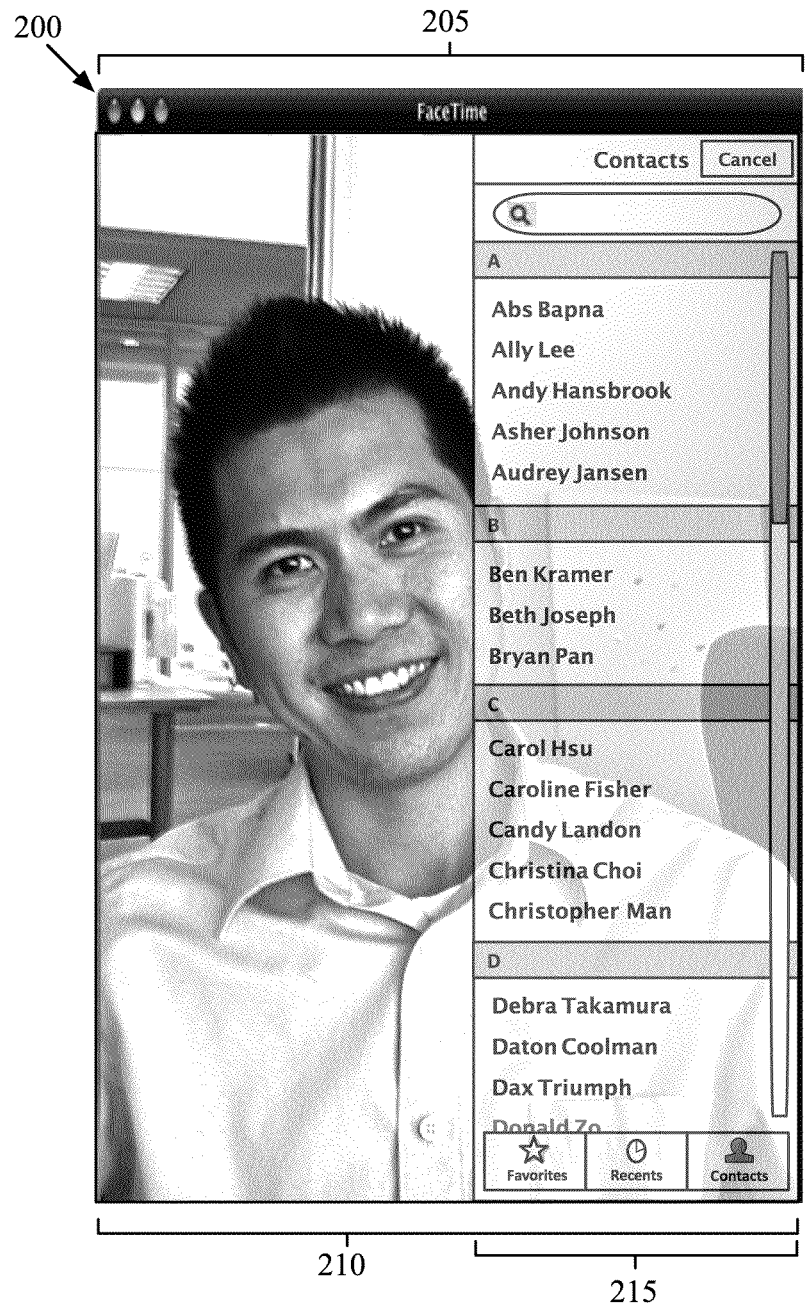
FIG. 2 conceptually illustrates another GUI of some embodiments of a video conferencing application that includes an overlay display area superimposed over a video display area.

FIG. 1 illustrated an example in which the video conferencing application displays the video in a landscape orientation in the video display area. In some embodiments, the video conferencing application is capable of displaying video in a portrait orientation. FIG. 2 illustrates an example of such a portrait display along with an overlay display area. As shown, FIG. 2 illustrates a GUI 200 that includes similar features to the GUI 100: a composite display area 205 that includes video display area 210 and overlay display area 215. The overlay display area 215 includes similar features to those shown in the overlay display area 115 of FIG. 1, though more contacts are displayed in overlay display area 215 due to the different orientation.

Different embodiments may use different default orientations for the video display area (and thus the composite display area). In addition, some embodiments enable the user to (i) specify different default orientations and (ii) switch orientations of the video during a video conference. In some embodiments, the user can toggle the orientation of both locally captured video and remotely captured video during the video conference.

Several more detailed embodiments are described below. Section I describes the initial setup and configuration of a video conferencing application through the overlay display area. Section II then describes the initiation of a video conference by selecting a contact in the overlay display area. Section III describes display during a video conference. Next, Section IV describes modification of the favorites list in the overlay display area. Section V describes the software architecture of a video conferencing application of some embodiments. Finally, Section VI describes an electronic system with which some embodiments of the invention are implemented.

I. Initial Setup of the Video Conferencing Application

As mentioned above, the video conferencing application of some embodiments provides an overlay display area that displays information for configuring the video conferencing application (e.g., a list of contacts with which a user can conference, setup and login information, etc.). Some embodiments display the overlay display area superimposed over images captured at the local computer on which the application operates.

As described above, one of the configuration processes performed through the overlay display area of some embodiments is the initial setup and configuration of the video conferencing application. Through the overlay display area, a user can create a new user account and input information (e.g., username, password, contacts, etc.) for that account.

Figure 3:
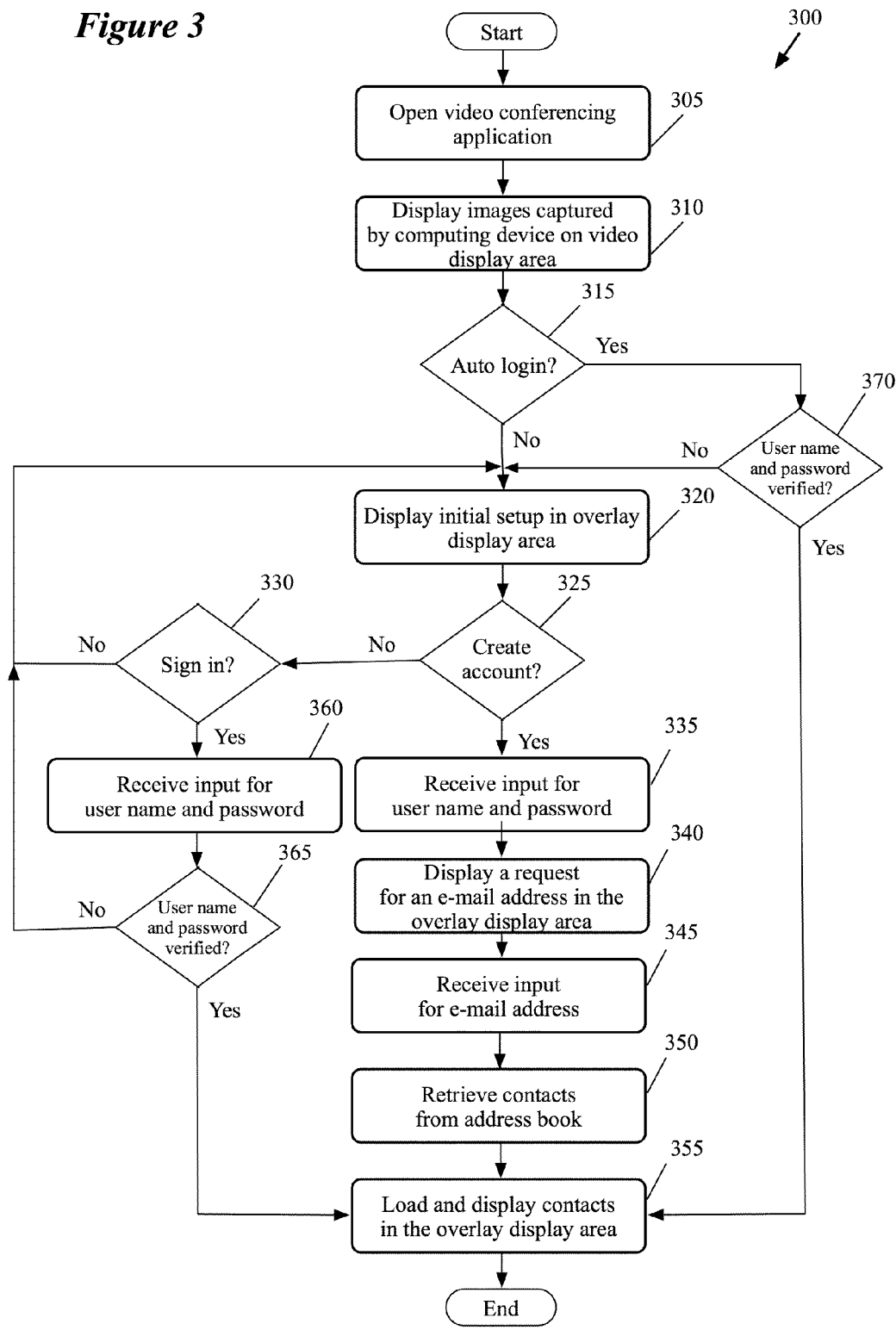
FIG. 3 conceptually illustrates a process of some embodiments for creating a new user account for a video conferencing application.
Figure 4:
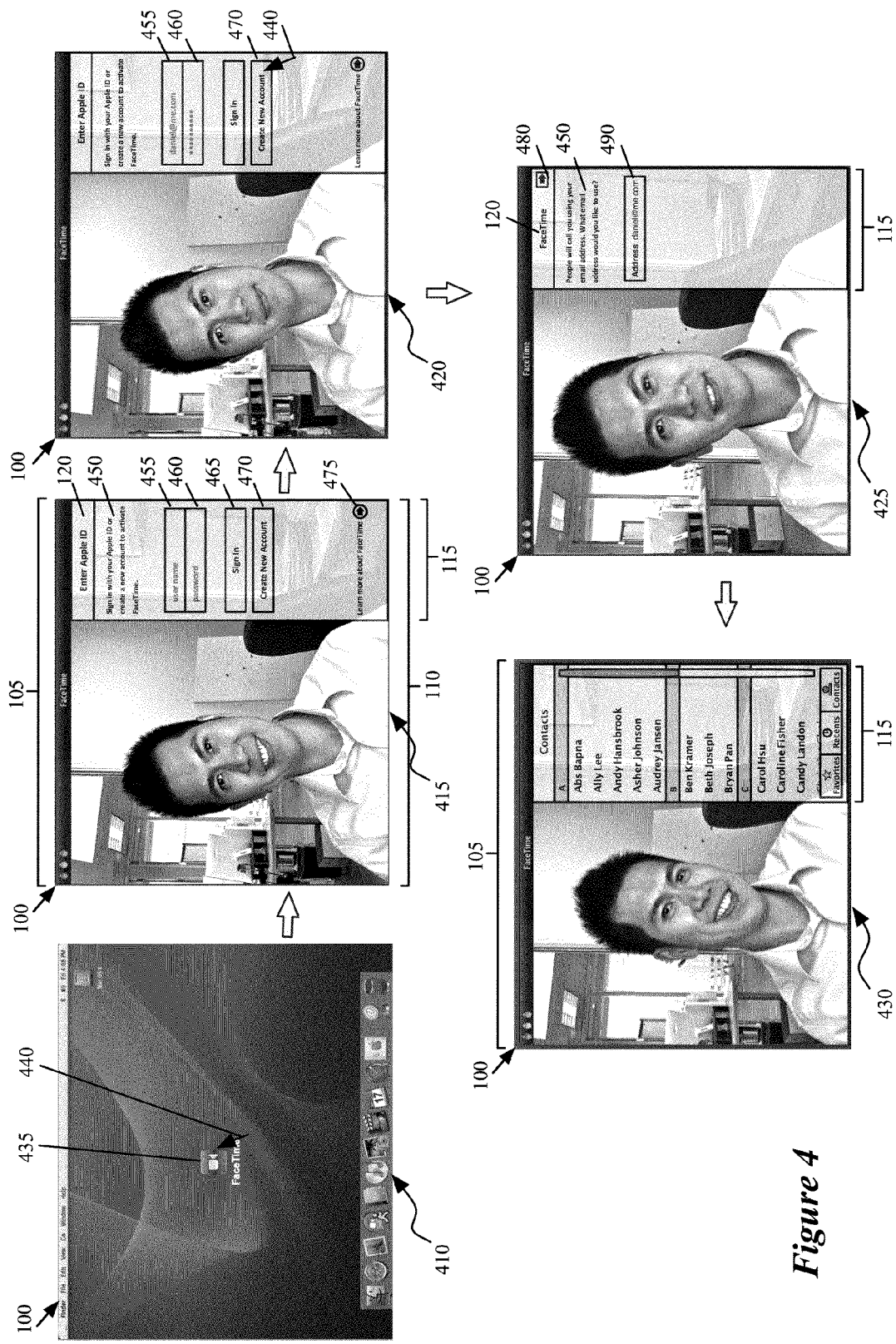
FIG. 4 illustrates a GUI of some embodiments of a video conferencing application with an initial setup.

FIG. 3 conceptually illustrates a process 300 of some embodiments for creating a new user account for a video conferencing application. The process 300 will be described by reference to FIG. 4, which illustrates an example of a video conferencing application of some embodiments with such a first time setup. FIG. 4 illustrates five stages 410-430 of GUI 100. As described above, the GUI 100 includes a composite display area 105. Displayed in the composite display area are a local video display area 110 and an overlay display area 115.

As shown in FIG. 3, the process 300 begins by opening (at 305) a video conferencing application on a computing device. The video conferencing application may be opened as the result of various user selection inputs—e.g., selecting an icon on a desktop, selecting an option in a menu (e.g., the Windows® Start menu), selecting an icon from a dock (e.g., the Mac® OS X dock), a command received through a command line interface, etc.). The computing device may be a server, personal computer, laptop, tablet computer, smartphone, etc.

The first stage 410 of FIG. 4 illustrates a user selecting an icon 435 for a video conferencing application (e.g., Facetime®) on a GUI 100 (e.g., a computer desktop). This stage illustrates the selection via a cursor 440. For instance, the user might place the cursor over the icon and enter selection input through a cursor controller. In other embodiments, the user might touch a location on a touchscreen at which the icon is displayed.

Next, the process 300 displays (at 310) images (e.g., a frame or field of video) captured by the computing device on which the video conferencing application operates. The computing device may include a camera that captures the images (i.e., as part of the hardware of the computing device) or the images may be captured by a camera coupled to the computing device (i.e., a peripheral device). Some embodiments allow the user of the computing device to select between multiple cameras that are either part of the local device or coupled to the local device. In some embodiments, the camera captures images at defined intervals (e.g., 10 times per second, every second, etc.) and the video conferencing application updates the display with the most recently captured image.

The process displays the images in a local video display area in some embodiments. Upon opening the application, the local video display takes up the entirety of a composite display area of the application's GUI in some embodiments. The composite display area itself may occupy only a portion of the screen on which the video conferencing application GUI is displayed, or may occupy the entirety of the screen (i.e., the screen of the computing device or a display device coupled to the computing device). The percentage of the screen space occupied by the composite display area can be configured by the user through the video conferencing application in some embodiments.

The process 300 then determines (at 315) whether an auto login option has been previously selected by the user. The selection can be made by checking a box labeled "enable auto-login" (e.g., through a click operation) in some embodiments, or through other user interface mechanisms. Selecting the auto login option allows the user to skip the login procedure (e.g., the entering of a user name and password) the next time the user opens the video conferencing application.

When the process 300 determines that the user has previously selected the auto login option, the process 300 determines (at 370) whether the previously entered user name and password are valid. Various embodiments verify the user name and password through information stored on the device with the video conferencing application, or by accessing a remote server that stores login information for numerous users at different locations.

When the process 300 determines that the login information is valid, the process 300 loads and displays (at 355) contacts from the user's address book in an overlay display area (the overlay display will be described further below). The address book can include different types of information (e.g., name, phone numbers, addresses, etc.) regarding each contact. In some embodiments, the user's address book is saved in the memory of the computing device. In some other embodiments, the user's address book can be retrieved from a server through a network or from a peripheral device coupled to the computing device. The video conferencing application displays the retrieved information in the overlay display area in an organized manner (either a default layout or a layout determined by the user). The process 300 then ends.

When the process 300 determines that the user has not previously select auto login, or that the auto login user name and/or password are invalid, the process displays (at 320) an overlay display area displaying an initial setup and configuration of the video conferencing application. The overlay display area of some embodiments, as described above by reference to FIG. 1, is a display area superimposed over a video display area within the composite display area. The overlay display area is partially transparent in some embodiments, such that the portion of a video or an image over which the overlay is displayed remains partially visible. As mentioned, the overlay display area displays initial setup and configuration information. Through this initial setup, the user can create a new user account or use an existing account to log into the video conferencing application.

The second stage 415 of FIG. 4 illustrates that upon opening the video conferencing application, the GUI 100 presents a composite display area 105. In some embodiments, the composite display area 105 initially displays the local video display area 110 and the overlay display area 115. As described above, the local video display area 110 is a video display of a video captured by the local computing device or a peripheral attached to the local computing device, while the overlay display area 115 is a display of an initial setup for the video conferencing application that overlays the video display. In this example, the video display area 110 presents a video of a man whose image is being captured by the local computing device.

At this second stage 415, the overlay display area 115 includes a description section 120, an information section 450, two entry fields 455 and 460, and three selectable UI items 465, 470, and 475. The description section 120 indicates to the user a description of the information presented in the overlay display. The information field 450 displays instructions or information regarding the current video conferencing information displayed in the overlay display area 115. The entry fields 455 and 460 allow a user to enter information (e.g., through a peripheral device), the selectable UI items 465 and 470 allow a user to select various options to configure the video conferencing application, and the selectable UI item 475 allow a user to obtain further information about the video conferencing application.

In this example, the description section 120 displays "Enter Apple ID", indicating to the user that the current overlay display area 115 is requesting the user to enter his user name for login purposes. The information section 450 in this example provides instructions to the user that the user may sign in with an existing account or create a new account. The entry fields 455 and 460 allow the user to enter his user name and password in order to login with an existing account. Selectable UI item 465 enables the user to sign in to the video conferencing application with an existing account after entering the user name and password into the entry fields. The selectable UI item 470 enables the user to create a new user account for the video conferencing application. Thus, when the user already has an account, he will enter his user name and password into entry fields 455 and 460 and select item 465. On the other hand, when the user does not have an existing account, he will select item 470.

The selectable UI item 475 of some embodiments enables the user to access information regarding the video conferencing application (Apple® Facetime®, in this example). The selectable items 465-475 can be implemented in a variety of different ways in different embodiments. As shown in FIG. 4, the selectable items are implemented as buttons in the GUI. The selectable buttons may have different sizes or shapes, or the items could be implemented as menu options, selected through keystrokes, etc.

Returning to FIG. 3, the process 300 then determines (at 325) whether a request to create a new user account is received. As described above, the user can select to create a new user account for the video conferencing application in some embodiments. When the process 300 receives a request from a user to create a new user account, the process 300 receives (at 335) a user input for a user name and password.

The third stage 420 of FIG. 4 illustrates that the user has input a user name and password into entry fields 455 and 460 and is selecting the "Create New Account" item 470 (i.e., via a cursor 440) in order to create a new user account for the video conferencing application with the user name of "daniel@me.com". The user can input this information through a keyboard, touchscreen, voice command, etc. Other embodiments ask the user to confirm the password, or provide a different series of displays in the overlay—for example, a user might be prompted with a separate display to enter a user name and password after selecting the new account item 470. Some embodiments also require the user to enter additional information (e.g., password retrieval information).

Upon receiving the user input for a user name and password, the process 300 displays (at 340) a request for an e-mail address of the user in the overlay display area. Some embodiments present an entry field, similar to fields 455 and 460, in which the user can enter his e-mail address. The process 300 then receives (at 345) the e-mail address input by the user.

The fourth stage 425 illustrates that the user has entered an email address in an entry field 490. At this point, the description section 120 reads "FaceTime", simply indicating the name of the video conferencing application. The information section 450 instructs the user to enter an e-mail address that the user would like others to use in order to contact him through the video conferencing application. The entry field 490 in this example enables the user to enter an e-mail address (in this example, "daniel@me.com"). The overlay 115 also displays a selectable UI item 480 (which can be implemented in any of the ways as described above) that enables the user to complete the account setup and advance to video conferencing.

The process 300 then retrieves (at 350) contacts from an address book associated with the e-mail address provided by the user for the user account. In some embodiments, the video conferencing application is configured to access one or more different e-mail applications (e.g., Microsoft® Outlook®, Microsoft® Entourage®, Mozilla® Thunderbird®, etc.) and identify contacts in an address book associated with the e-mail address. Some embodiments may also access a separate address book application to identify and retrieve contacts. In some embodiments, the user must be logged into the e-mail application with the e-mail address in order for the video conferencing application to have access to the address book, while in other embodiments the video conferencing application can access the contacts without the user being logged in to the e-mail. In some embodiments, the e-mail and video conferencing functionalities are integrated (e.g., in a smartphone).

After initial setup of a user account, some embodiments store the user's contacts in an address book with the video conferencing application. Other embodiments retrieve the contacts from an address book associated with an e-mail application each time the user logs in. Yet other embodiments store contacts in an address book shared with multiple applications on the computing device. The address book may be stored locally or on a remote server (e.g., the same server or set of servers used to verify login information).

After retrieving the contacts from the address book, the process 300 loads and displays (at 355) the contacts in the overlay display area. The process 300 then ends. In some embodiments, all the contacts from the user's address book are retrieved and displayed in the overlay display area. In other embodiments, only contacts that fulfill certain requirements (e.g., have video conferencing capabilities) are retrieved and/or displayed. Such requirements may be specified by the user through a preference setting in some embodiments. In order to identify which contacts have video conferencing capabilities, the video conferencing application of some embodiments may filter the contacts based on a flag indicating this capability, the domain of the e-mail address, etc.

The fifth stage 430 of FIG. 4 illustrates the composite display area 105 after the initial setup is complete and the overlay display area 115 is displaying the new user's contacts. The user may now initiate a video conferencing session with a remote user or be invited to a video conferencing session initiated by a remote user.

The composite display illustrated in stages 415-430 of FIG. 4 is one example of a composite display that combines the video display area that displays captured images of the user and the overlay display area that displays information for configuring the video conferencing application. For example, the overlay could be on the right side of the composite display, or the top or bottom. Some embodiments do not use an overlay, but rather display configuration information separately, without superimposing the information over the captured video images (e.g., in a split-screen fashion). Some embodiments allow the user to specify a default manner of displaying the information.

Returning to FIG. 3, when the user has not chosen to create a new user account, the process 300 determines (at 330) whether a request to sign in has been received. If the user has a previously created user account for the video conferencing application, the user can sign into the video conferencing application with this account.

When the process 300 determines that the user has not selected to sign in, the process continues to display (at 320) the initial setup and configuration information in the overlay display area. When the user chooses to sign in, the process 300 receives (at 360) a user name and password. The process 300 then determines (at 365) whether the login information received is valid. As described above, some embodiments store this information locally with the application, while other embodiments contact a remote server to validate the login information.

When the process 300 determines that the login information is valid, the process loads and displays (at 355) the user's contacts in the overlay display area. As described above, the contacts may be stored in an address book specific to the video conferencing application or shared with other applications. The address book may be locally or remotely located in different embodiments. After displaying the user's contacts in the overlay display area, the process 300 then ends.

When the process 300 determines that the login information is not valid, the process returns to 320 to continue displaying the initial setup information in the overlay display area. Some embodiments also display a message stating that the user name and/or password are invalid.

In the GUI 100 displayed in FIG. 4, when the user selects the "Sign In" item 465, the video conferencing application verifies whether the login information entered by the user is valid and displays the user's contacts in the overlay display area 115, such as that shown at stage 430.

After the initial setup (e.g., registration for video conferencing sessions with a registration server) is complete, the local computing device can invite and/or accept invitations for video conferencing sessions. The local device is identified in the video conferencing sessions through a video conferencing session endpoint identifier. While in one embodiment the video conferencing session endpoint identifier is a phone number of the local device, in other embodiments the video conferencing session endpoint identifier is a different identifier (e.g., a username (e.g., an Apple ID), an email address, a mailing address, a MAC address, or other identifier).

II. Initiation of a Video Conferencing Session

As described above, the video conferencing application of some embodiments provides an overlay display area, transparently superimposed over a video display area, that displays information for configuring the video conferencing application. In addition to the initial setup and configuration described in the previous section, some embodiments allow the initiation of a video conference through the overlay display area. Through the overlay display area, a user can initiate a video conference by selecting a contact with whom the user wants to have a video conference.

Figure 5:
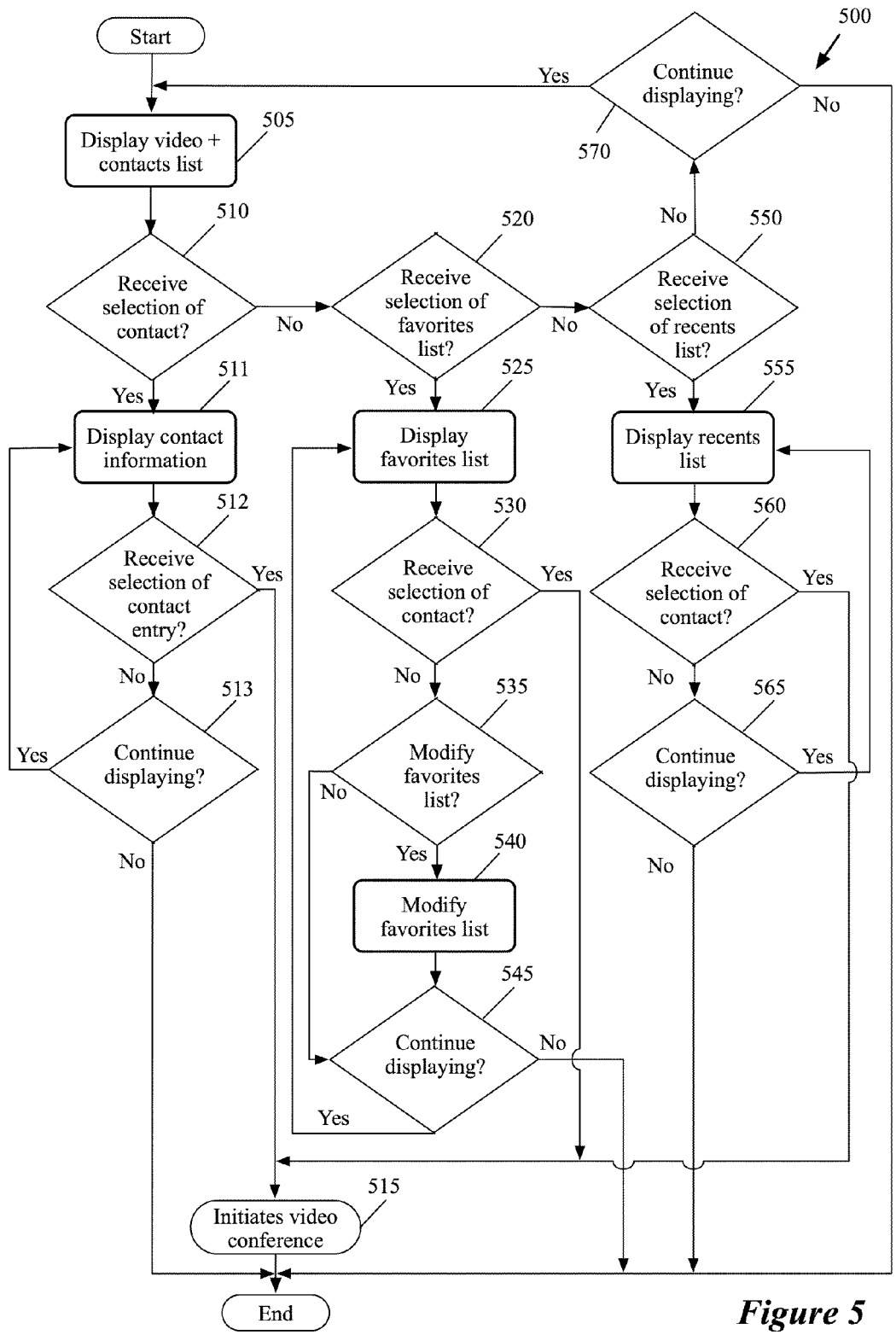
FIG. 5 conceptually illustrates a process of some embodiments for initiating a video conference with a remote user through an overlay display area of a video conferencing application.
Figure 6:
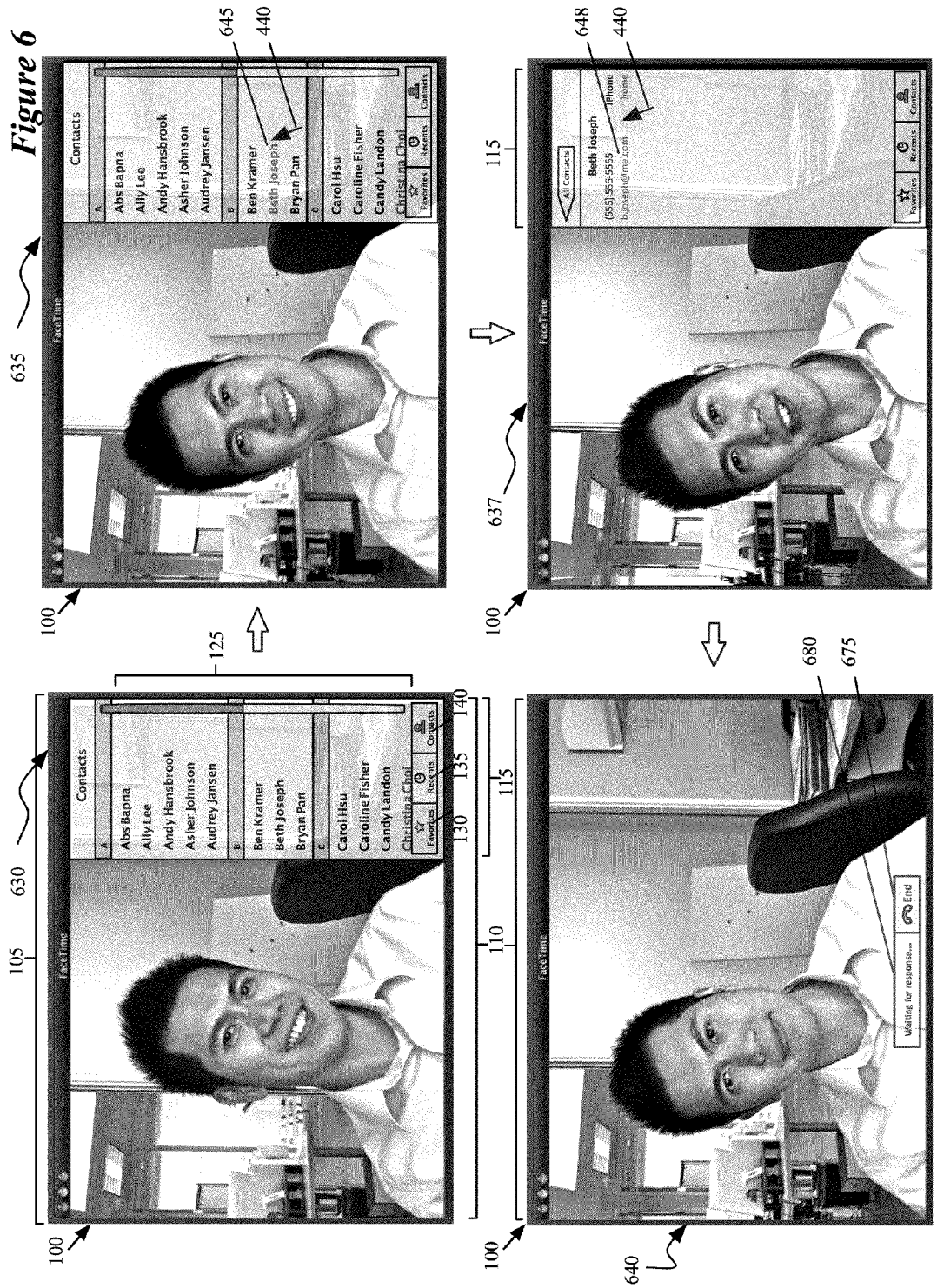
FIG. 6 illustrates a GUI of some embodiments of a user requesting a video conferencing session with a remote user through a contacts list displayed in an overlay display area.
Figure 7:
FIG. 7 illustrates a GUI of some embodiments of a user requesting a video conferencing session with a remote user through a favorites list displayed in an overlay display area.
Figure 8:
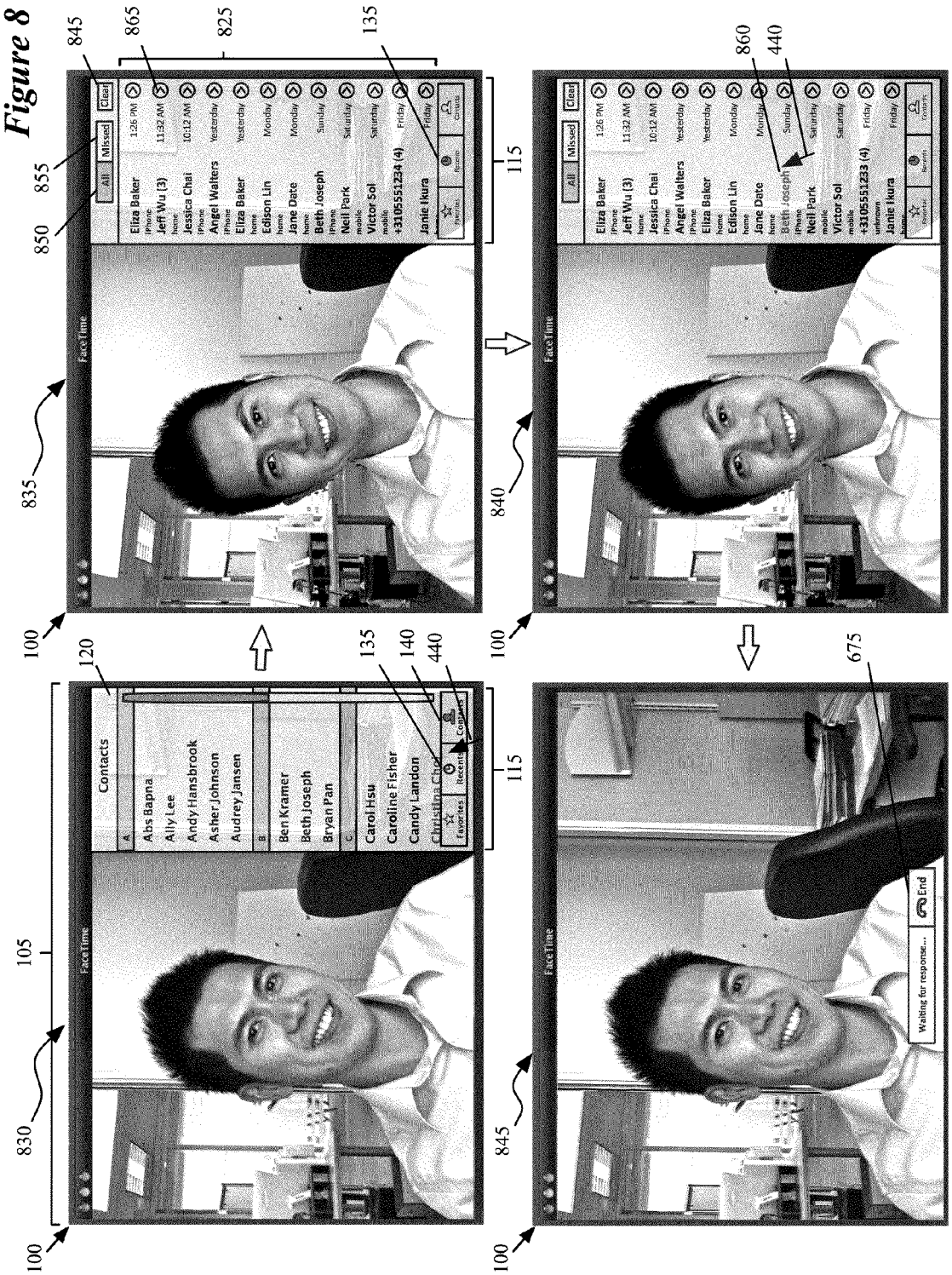
FIG. 8 illustrates a GUI of some embodiments of a user requesting a video conferencing session with a remote user through a recents list displayed in an overlay display area.

FIG. 5 conceptually illustrates a process 500 of some embodiments for initiating a video conference through the overlay display area of a video conferencing application. The process 500 will be described by reference to FIGS. 6-8, which illustrate examples of such initiation sequences through a video conferencing application of some embodiments. FIGS. 6-8 illustrate three different examples of a local user requesting a video conferencing session with a remote user through the overlay display area.

As shown in FIG. 5, the process 500 begins by displaying (at 505) a video in a video display area and a contacts list in an overlay display area. One of ordinary skill will recognize that the process 500 may be a continuation of process 300 in some embodiments. That is, after a user signs into and/or initially configures a video conferencing application (as described by reference to process 300), the user can then begin to initiate a video conference as described below. Some embodiments display the video and contacts list in a composite display area that includes a video display area and an overlay display area.

FIG. 6 illustrates a local user initiating a video conference with a remote user through four stages 630-640 of the GUI 100. The first stage 630 illustrates a composite display area 105, which includes a local video display area 110 and an overlay display area 115. The local video display area 110 displays images of the local user taken by a camera at the local computing device, and the overlay display area 115 displays a list of contacts with which the local user can initiate a video conference. The information displayed in the overlay display area 115 in the first stage 630 is identical to the information displayed in the overlay display area 115 (i.e., the contacts list) in the fifth stage 430 of FIG. 4.

In some embodiments, the contacts list includes a selectable item for each contact 125 retrieved from the user's address book. In addition, below the contacts list are the selectable items 130, 135, and 140, described above by reference to FIG. 1. At this stage, the contacts list selectable item 140 is highlighted, indicating that all contacts retrieved from the local user's address book are presently displayed in the overlay display area 115.

The process 500 then determines (at 510) whether the local user has selected a contact with whom the user desires to conference from the list of contacts displayed in the overlay display area. In some embodiments, the user performs this selection by touching the screen at the location of the selectable item for this contact, by using a cursor controller to position a cursor over the selectable item and performing a selection operation with the cursor controller, by issuing a voice command, etc.

When the process 500 determines that the user has selected a contact, the process displays (at 511) information about the selected contact. The information, in some embodiments, includes a list of different contact entries for the selected contact as well as additional personal information about the contact (e.g., date of birth, any notes about the contact, etc.). For instance, a single contact (i.e., person) might have multiple phone numbers, e-mail addresses, etc. at which he can be reached. Some embodiments only include contact entries capable of video conferencing, while other embodiments include all entries for a contact. In some embodiments, when a user selects a contact entry that is not video conferencing-capable (e.g., a landline phone number), the video conferencing application selects a different entry for the same contact (e.g., an e-mail address).

The second stage 635 of FIG. 6 illustrates the selection of a particular contact 645 ("Beth Joseph") by the local user. Stage 635 illustrates the performance of this selection through a single cursor click operation 440, though as mentioned above the user can perform this selection in a variety of ways. As shown in the second stage 635 of FIG. 6, the video conferencing application indicates this selection by highlighting the contact. Different embodiments may indicate such a selection in different ways (e.g., by highlighting the border or the text of the item, changing the color of the item, bolding the item, etc.).

The process 500 next determines (at 512) whether the local user has selected a contact entry at which to reach the contact for which information is currently displayed. In some embodiments, the user performs this selection by touching the screen at the location of the selectable item for this contact entry, by using a cursor controller to position a cursor over the selectable item and performing a selection operation with the cursor controller, by issuing a voice command, etc.

When the process determines that the user has selected a particular contact entry, the process initiates (at 515) a video conference with the contact at the selected device, then ends. The third stage 637 of FIG. 6 illustrates the GUI 100 after the user has selected the contact 645. The overlay display area 115 now displays detailed information for the selected contact. In this case, the overlay display area 115 displays two entries for Beth Joseph: a phone number and an e-mail address. As shown, the user selects the selectable item 648 representing the e-mail address via a click operation with cursor 440. As with the other selections, different embodiments allow the user to select these items in a variety of ways (e.g., via a touchscreen, a cursor controller, keyboard input, etc.) In this example, the video conferencing application indicates this selection by highlighting the selected entry. Again, different embodiments may indicate such a selection in different ways (e.g., by highlighting the border or the text of the item, changing the color of the item, bolding the item, etc.).

In this example, the selected entry is an e-mail address. In order to contact an e-mail address, some embodiments send invitations to any device with which the e-mail address of the selected contact is associated and at which the selected contact is logged on to a video conferencing application. In order to determine these devices, some embodiments send a request to a centralized server or set of servers associated with the video conferencing application. The set of servers sends out an invitation request to any devices (e.g., laptop computers, desktop computers, smartphones, tablet computers, media players, etc.) at which the remote user (the selected contact) is currently logged into the video conferencing application. In some embodiments, the network of users is a proprietary network that only includes users of a particular video conferencing application (e.g., Apple® FaceTime®). In other embodiments, the network is a more open network accessible to additional video conferencing applications.

When the selected entry is a phone number, some embodiments send a request to the device (i.e., phone) associated with the selected phone number. For instance, in the example of stage 637, if the user selects the entry for Beth Joseph's iPhone, the application would send a request to the iPhone. However, some phones (e.g., some wireless phones, landlines, etc.) cannot participate in a video conference. Some embodiments prevent a user from selecting such a contact entry (e.g., by graying out the contact entry, removing the contact entry, etc.). On the other hand, some embodiments automatically select a different device when a user selects such a contact entry. For instance, the application might automatically select an iPhone number, an e-mail address, etc.

The fourth stage 640 illustrates that the user has selected a particular contact entry and the video conferencing application is in the process of inviting the selected contact to a video conference. This stage 640 is a hold stage while the local computing device waits for the video conference to be established (e.g., while the local computing device waits for the device on the other end of the call to accept or reject the video conference invitation).

In the fourth stage 640, the local video display area 110 of some embodiments provides a notation field 680 and a selectable UI item 675. The selectable UI item 675 in this example enables the local user to cancel the video conference request if he decides not to enter the video conference at this stage (e.g., while the local user waits for the remote user to respond to the request). The notation field 680 displays an indicator of the current status of the video conference request. In this example, the notation field 680 displays "Waiting for response . . . ", indicating that the video conferencing application is currently waiting for the remote user's response to establish a video conference.

The fourth stage 640 may be displayed differently in some embodiments. As shown, some embodiments display this wait state using a full screen display of locally captured video along with a notation indicating that the application is waiting for a response and a selectable item for ending the conference setup. In other embodiments, the application may display the wait state using an image stored on the local device or a smaller version of the locally captured video. Some embodiments also provide a different message to highlight the wait state of the device rather than that shown in FIG. 6.

Upon the initiation of the video conference, some embodiments display a menu that enable the user to switch the camera used to capture video of the user for the video conference, when multiple cameras are available. When the user selects a different camera, the video displayed in the local video display area switches to video captured by the newly selected camera.

Returning to FIG. 5, when the user has not selected a contact entry, the process determines (at 513) whether to continue displaying the contact entry information in the overlay display area. The process may cease to display the contact entry information when, for example, the user chooses to quit the video conferencing application, remove the overlay display area from the display, power down the device on which the application operates, etc. The process will also cease to display the contact entry information when the user selects a different contacts list (e.g., the favorites list, the recents list, etc.), or the user selects to go back to the contacts list. These transitions are not illustrated in FIG. 5 for simplicity, but one of ordinary skill in the art would realize, for example, that if a user selected to view the full contacts list, the process would transition to operation 505 to display that list. When no action is taken to end the display of the contact entry information, the process 500 returns to 511 to continue displaying the contact entry information.

When the user has not selected a contact (at 510, described above), the process determines (at 520) whether the user has selected a favorites list to view in the overlay display area. The favorites list includes a list of contacts that are designated by a user as his favorite contacts. A user may add and/or delete a particular contact from his favorites list depending on how frequently the user contacts the particular contact or how accessible the user wants the particular contact to be. Some embodiments automatically add a particular contact as a favorite when the user communicates with the particular contact on a regular basis. Moreover, in some embodiments, the user may specify an order of the contacts displayed in the favorites list.

In some embodiments, the user can choose to view the favorites list by selecting a favorites list selectable item (e.g., item 130) in the overlay display area (e.g., through a click operation with a cursor controller, a touchscreen selection, etc.). Different embodiments may allow the user to choose to view the favorites list by other mechanisms, such as a menu option, a hotkey or set of keystrokes, etc.

When the user selects to view the favorites list, the process 500 displays (at 525) the favorites list in the overlay display area. Otherwise, the process proceeds to 550, described below. As described above by reference to FIG. 1, the overlay display area of some embodiments is a semi-transparent display area superimposed over a video display within the composite display area.

FIG. 7 illustrates an example of the initiation of a video conference with a remote user through a favorites list in the overlay display area. The video conference initiation is illustrated in four stages 730-745 of the GUI 100 in which the user selects the favorites list and then selects a contact from the favorites list with whom to initiate a video conference. The first stage 730 illustrates composite display area 105 in the same state as at stage 630 of FIG. 6, with the contacts selectable item 140 highlighted and all of the local user's contacts displayed in the overlay display area 115. At this stage, however, the user has placed the cursor 440 over the favorites selectable item 130 in the overlay display area 115 and is in the process of selecting the item (e.g., through a click operation with a cursor controller).

In the second stage 735, the user has selected the favorites list selectable item 130 in order to view the favorites list on the overlay display area 115. The selection is indicated through a highlighting of a portion (e.g., the star icon) of the favorites list selectable item 130 as shown in the second stage 735 of FIG. 7. Different embodiments may indicate such a selection in different ways (e.g., by highlighting the border or the text of the item, highlighting the entire item, graying out the item, giving the item a three-dimensional appearance, etc.).

In some embodiments, upon the user's selection of the favorites list, the video conferencing application replaces the elements (e.g., the selectable items, entry fields, information section, etc.) displayed in the overlay display area with a new set of elements for the favorites list. Other embodiments perform the transition from one type of list (e.g., contacts list, favorites list, recents list, etc.) to another using an animated effect (e.g., sliding the current overlay display area off the composite display area and then sliding a refreshed overlay display back onto the composite display area). Various other embodiments perform the transition between types of information in the overlay display area in different manners (e.g., different animation, etc.).

At this stage, the description section 120 of the overlay display area displays "Favorites", indicating that the application is displaying the favorites list. The description section also includes selectable items 750 and 755, which allow the user to modify the favorites list (e.g., add, remove, or modify the contacts in the favorites list). These selectable items will be described in further detail below in Section IV.

The majority of the overlay display area 115 displays a list of selectable items 725 that each represents a contact entry. As shown, a contact may have multiple entries; for instance, "John Chen" has two entries in the favorites list shown at stage 735. Each contact entry selectable item 725 includes the name of the contact (e.g., "John Chen", "Neil Parker", etc.) as well as an entry type. In the illustrated example, the contact John Chen has two entries of different types: an iPhone entry and a work entry.

In some embodiments, a user inputs the entry type for each entry. That is, when entering the phone number for a particular contact, the user can indicate whether the phone number is an iPhone, a generic mobile phone, a work phone, a home phone, etc. E-mail addresses may be listed as home or work e-mails in some embodiments, or simply as e-mail. Some embodiments, on the other hand, automatically identify certain entries—for instance, a centralized set of servers used for connecting users of the video conferencing application may indicate that a particular phone number is associated with an iPhone.

Each selectable contact entry item 725 also includes a video camera icon that indicates whether the particular entry is video conferencing capable. As shown, some of the icons shown in FIG. 7 include a question mark. This indicates that the application does not know whether the contact entry is capable of participating in a video conference. Once a user has engaged in a video conference with a particular contact at a device associated with a particular entry, or otherwise determined that a particular entry is associated with a video conferencing capable device, the video conferencing application removes the question mark. Some embodiments leave the question mark after unsuccessful attempts, as a non-response may be due to the remote user not answering a request rather than the device not being video conferencing capable. In some embodiments, when particular error messages are received, the video conferencing application will indicate that a particular entry is not video conferencing capable (e.g., by flagging the particular entry, by graying out the particular entry, etc.) or will remove the entry from the contacts list.

The selectable contact entry items 725 enable the user to select a particular contact with whom the user wants to video conference and a device of the particular contact at which to contact the particular contact for the video conference. Upon selection of a particular contact entry, the local user's device sends a video conference invitation to the selected device of the particular contact. In some embodiments, the selectable contact entry items may also enable the user to view and/or modify information about the contact or contact entry. For instance, some embodiments will initiate a video conference with a contact when a user selects a selectable item using a first selection input (e.g., a single click or tap) and will display editable information about the contact when the user selects the selectable item using a different second selection input (e.g., a double click or tap). Additionally, some embodiments enable a user to select a contact entry by its order in the favorites list (e.g., using a speed dial number that corresponds to a contact entry's order in the favorite list).

Returning to FIG. 5, the process 500 then determines (at 530) whether the user has selected a contact with whom the user desires to initiate a video conference. In some embodiments, the user performs this selection by touching the screen at the location of the selectable item for this contact (or contact entry), by using a cursor controller to position a cursor over the selectable item and performing a selection operation with the cursor controller, by issuing a voice command, etc.

As described above by reference to operation 510, when the user has selected a contact, the process 500 initiates (at 515) a video conference with the selected contact. When a particular device of the contact is specified, the process initiates a video conference by sending an invitation to the particular device. The process 500 then ends.

The third stage 740 of FIG. 7 illustrates the selection of a particular contact entry 760 ("Beth Joseph", an iPhone entry) with which to initiate a video conference. In this example, the user performs the selection via a click operation with the cursor 440 over the selectable item 760. Different embodiments may perform the selection in different ways, as described above. The GUI indicates the selection by highlighting the contact entry item 760 as the user performs the selection operation. Different embodiments may indicate such a selection in different ways (e.g., by highlighting the border or the text of the item, etc.).

The fourth stage 745, similar to the fourth stage 640 in FIG. 6, illustrates that the user has selected a contact and the video conferencing application is in the process of inviting the selected contact to a video conference. This stage 745 is a hold stage while the local computing device waits for the video conference to be established (e.g., while the local computing device waits for the device on the other end of the call to accept or reject the video conference invitation). As described above, the GUI 100 of some embodiments provides an End selectable item 675 that allows the user to cancel the video conference request if he decides not to enter the video conference at this stage (e.g., while the user is waiting for the remote user to respond to his request).

When the user has not yet selected a contact to call, the process 500 determines whether the user has chosen to modify (at 535) the favorites list displayed in the overlay display area. In some embodiments, the favorites list can be modified by adding contacts to the favorites list, deleting contacts from the favorites list, or editing the contacts in the favorites list. A user might choose to add a contact to his favorites list in order for the contact to appear on a shorter list (as opposed to the full contacts list), thereby making it easier for the user to locate and select the contact. On the other hand, a user might choose to delete a contact from his favorites list in order to shorten the list by removing a contact with whom the user interacts less frequently.

When the process 500 determines that the user has chosen to modify the favorites list, the process 500 performs (at 540) the modification. Some examples of procedures for modifying the favorites list are further described below in Section IV.

The process then determines (at 545) whether to continue displaying the favorites list in the overlay display area. The process may cease to display the favorites list when, for example, the user chooses to quit the video conferencing application, remove the overlay display area from the display, power down the device on which the application operates, etc. The process will also cease to display the favorites list when the user selects a different contacts list (e.g., the full contacts list, the recents list, etc.). These transitions are not illustrated in FIG. 5 for simplicity, but one of ordinary skill in the art would realize, for example, that if a user selected to view the full contacts list, the process would transition to operation 505 to display that list. When no action is taken to end the display of the favorites list, the process 500 returns to 525 to continue displaying the favorites list.

When the user has not chosen to view the favorites list (at 520), the process 500 determines (at 550) whether the user has chosen to view the recents list. The recents list includes a list of the contacts most recently contacted by the user or who most recently contacted the user. Some embodiments limit the recents list to contacts who video conferenced with the user (or attempted to video conference with the user), while other embodiments display contacts who contacted the user (or whom the user contacted) in any form (e.g., phone call). In some embodiments, contacts that attempted to reach the user unsuccessfully (or whom the user unsuccessfully attempted to contact) are also listed in the recents list. In some embodiments, the user can choose to view the recents list by selecting a recents list selectable item (e.g., item 135) in the overlay display area (e.g., through a click operation with a cursor controller, a touchscreen selection, etc.). Different embodiments may allow the user to choose to view the recents list by other mechanisms, such as a menu option, a hotkey or set of keystrokes, etc.

When the user selects to view the recents list, the process 500 displays (at 555) the recents list in the overlay display area. Otherwise, the process proceeds to 570, described below. As described above by reference to FIG. 1, the overlay display area of some embodiments is a semi-transparent display area superimposed over a video display within the composite display area.

FIG. 8 illustrates an example of the initiation of a video conference with a remote user through a recents list in the overlay display area. The video conference initiation is illustrated in four stages 830-845 of the GUI 100 in which the user selects the recents list and then selects a contact from the recents list with whom to initiate a video conference. The first stage 830 illustrates composite display area 105 in the same state as at stage 630 of FIG. 6, with the contacts selectable item 140 highlighted and all of the local user's contacts displayed in the overlay display area 115. At this stage, however, the user has placed the cursor 440 over the recents selectable item 135 in the overlay display area 115 and is in the process of selecting the item (e.g., through a click operation with a cursor controller).

In the second stage 835, the user has selected the recents list selectable item 135 in order to view the recents list on the overlay display area 115. The selection is indicated through a highlighting of a portion (e.g., the clock icon) of the recents list selectable item 135 as shown in the second stage 835 of FIG. 8. Different embodiments may indicate such a selection in different ways (e.g., by highlighting the border or the text of the item, highlighting the entire item, graying out the item, giving the item a three-dimensional appearance, etc.).

In some embodiments, upon the user's selection of the recents list, the video conferencing application replaces the elements (e.g., the selectable items, entry fields, information section, etc.) displayed in the overlay display area with a new set of elements for the recents list. Other embodiments perform the transition from one type of list (e.g., contacts list, favorites list, recents list, etc.) to another using an animated effect (e.g., sliding the current overlay display area off the composite display area and then sliding a refreshed overlay display back onto the composite display area). Various other embodiments perform the transition between types of information in the overlay display area in different manners (e.g., different animation, etc.).

At this stage, the description section 120 of the overlay display area displays three selectable items 845-855. Selection of the "All" selectable item 850 causes the overlay display area 115 to display all of the most recent calls made or received by the video conferencing application (i.e., including the missed calls), while selection of the "Missed" selectable item 855 causes the overlay display area 115 to display only recent calls missed (i.e., when a remote user sent a video conference request in order to attempt to initiate a video conference with the video conferencing application and the local user was unable to answer the request. The "Clear" selectable item 845 enables the user to clear out the recents list (e.g., remove the entries displayed under the recents list).

The majority of the overlay display area 115 displays a list of selectable items 825 that each represents a contact entry. As described above by reference to FIG. 7, some embodiments allow a contact to have multiple entries. Each selectable item 825 displays the contact name, contact type (e.g., home, work, iPhone, mobile, etc.), and the time of the call/video conference (or attempted call/video conference) between the local user and the contact. When there has been more than one consecutive call/video conference (or attempted call/video conference) to or from a contact, some embodiments list the number of such calls/video conferences. Some embodiments only list recent video conferences in the recents list, while other embodiments also list other forms of contact (e.g., voice-only calls).

The selectable contact entry items 825 enable the user to select a particular contact with whom the user wants to video conference and a device of the particular contact at which to contact the particular contact for the video conference. Upon selection of a particular contact entry, the local user's device sends a video conference invitation to the selected device of the particular contact. In some embodiments, the selectable contact entry items may also enable the user to view and/or modify information about the contact or contact entry. For instance, when a user selects one of the chevron icons 865 in each of the contact entry items 825 (e.g., by clicking on the chevron with a cursor controller, touching the chevron on a touchscreen, etc.), information about the contact will be displayed in the overlay display area. This information may include general information about the contact (e.g., phone number, e-mail address, etc.) as well as information about recent communications with the contact (e.g., time and date of previous video conferences). In some embodiments, the application also displays a selectable UI item that enables a user to add the selected contact to the list of contacts or favorites list.

Returning to FIG. 5, the process 500 then determines (at 560) whether the user has selected a contact with whom the user desires to initiate a video conference. In some embodiments, the user performs this selection by touching the screen at the location of the selectable item for this contact (or contact entry), by using a cursor controller to position a cursor over the selectable item and performing a selection operation with the cursor controller, by issuing a voice command, etc.

As described above by reference to operation 510, when the user has selected a contact, the process 500 initiates (at 515) a video conferencing session with the selected contact. When a particular device of the contact is specified, the process initiates a video conference by sending an invitation to the particular device. The process 500 then ends.

The third stage 840 of FIG. 8 illustrates the selection of a particular contact entry 860 ("Beth Joseph", an iPhone entry, as in FIG. 7) with which to initiate a video conference. In this example, the user performs the selection via a click operation with the cursor 440 over the selectable item 860. Different embodiments may perform the selection in different ways, as described above. The GUI indicates the selection by highlighting the contact entry item 860 as the user performs the selection operation. Different embodiments may indicate such a selection in different ways (e.g., by highlighting the border or the text of the item, etc.).

The fourth stage 845, similar to the fourth stage 640 in FIG. 6, illustrates that the user has selected a contact and the video conferencing application is in the process of inviting the selected contact to a video conference. This stage 845 is a hold stage while the local computing device waits for the video conference to be established (e.g., while the local computing device waits for the device on the other end of the call to accept or reject the video conference invitation). As described above, the GUI 100 of some embodiments provides an End selectable item 675 to allow the user to cancel the video conference request if he decides not to enter the video conference at this stage (e.g., while the user is waiting for the remote user to respond to his request).

When the user has not yet selected a contact to call, the process 500 determines whether to continue displaying (at 565) the recents list in the overlay display area. As described above, the process may cease to display the recents list when the user quits the application, removes the overlay display area from the display, powers down the device on which the application operates, etc. The process will also cease to display the recents list when the user selects a different contacts list (e.g., the full contacts list, the favorites list, etc.). These transitions are not illustrated in FIG. 5 for simplicity, but one of ordinary skill in the art would realize, for example, that if a user selected to view the favorites list, the process would transition to operation 525 to display that list. When no action is taken to end the display of the recents list, the process 500 returns to 555 to continue displaying the recents list.

When the user has not selected a contact with whom to initiate a video conference nor selected the favorites or recents lists, the process determines (at 570) whether to continue displaying the contacts list and video. As described in the above paragraph, the process may cease to display this information when the user quits the application, etc. When no action is taken by the user, the process 500 returns to 505 to continue displaying the contacts list and video. When the user performs one of the actions to end the display of the video and contacts list, the process ends.

One of ordinary skill in the art will recognize that process 500 is a conceptual example of a process for initiating a video conference based on input received through an overlay display area of a video conferencing application. While the process 500 illustrates particular operations being performed in a particular order, some embodiments may perform these same operations in a different order. In addition, rather than checking repeatedly to determine whether one of a variety of different inputs have been selected, some embodiments operate in a wait state until selection input is received, then transition to a new state according to the selection input. For instance, while displaying the contacts list, some embodiments do not repeatedly check whether a contact or a different list has been selected, but instead simply display the contacts list until new input is received (e.g., to display the favorites list).

While FIGS. 5-8 illustrate a local user inviting a single remote user to a video conferencing session, some embodiments allow a local user to invite multiple users to a video conferencing session. In some embodiments, the local user may transmit a single invite request to an invitation service with multiple remote user identifiers to invite multiple users at different computing devices to participate in a video conferencing session.

III. Display During a Video Conference

After the user selects a contact with whom to initiate a video conference, the video conferencing application attempts to connect to the selected contact's device. During the connecting and conferencing process, the non-initiating party (i.e., the selected contact) will be referred to as a remote user, as compared with the initiating local user. The initiating device sends an invitation to the remote device requesting a connection for a video conference. When the remote user responds affirmatively, a video conference can be established between the two devices. When the remote user either responds by declining the invitation or does not respond after a particular amount of time, then a video conference is not established.

Figure 9:
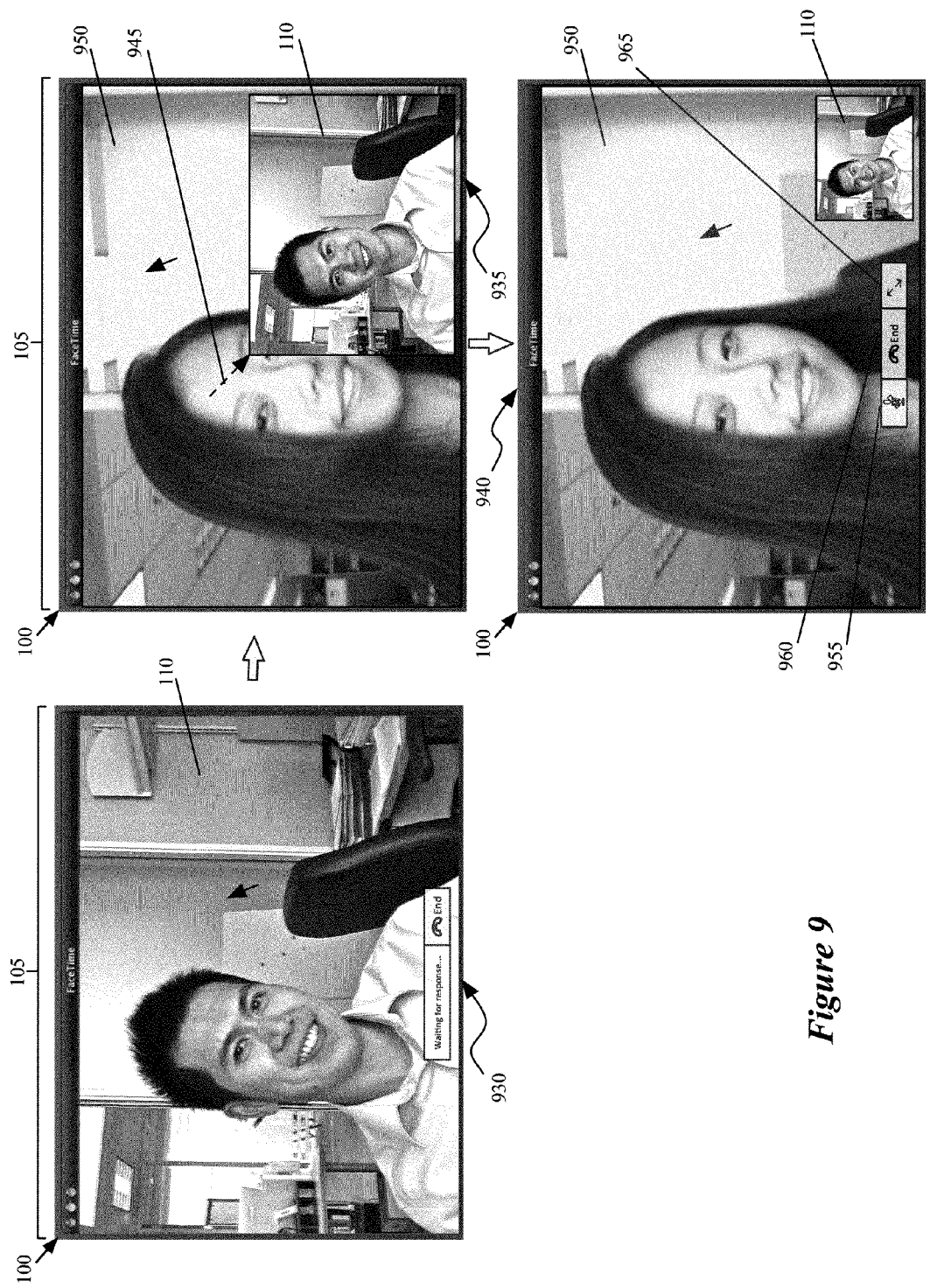
FIG. 9 illustrates a GUI of some embodiments of a connection sequence displayed on a local user's device after a remote user has accepted the local user's invitation to a video conference.

FIG. 9 illustrates a connection sequence displayed on a local user's device after the local user has initiated a video conference request with a remote user. FIG. 9 illustrates this connection sequence in three stages 930-940 in which a video conference is successfully established. The first stage 930 is similar to the last stages 645, 745, and 845 of FIGS. 6-8, at which point the GUI indicates to the local user that the video conferencing application is waiting for a response from the remote user to whom an invitation was sent.

When the remote user accepts the invitation, the local user's GUI transitions to displaying video of the remote user in some embodiments. The second and third stages 935 and 940 illustrate one example of one such a transition. In the second stage 935, the local video display area 110 that displays the video images of the local user (captured by a camera at the local device) gradually decreases in size (i.e., gradually shrinks) as indicated by the arrow 945. As the local video display area 110 shrinks, the majority of the composite display area 105 is replaced by a remote video display area 950 that displays images captured from a camera of the remote user's device. The composite display area 105 displays the remote video display area 950 behind the shrinking local display area 110.

In other words, the shrinking of the local video display area 110 creates a picture-in-picture (PIP) display that includes the local video display area 110 as a foreground inset display and the remote user video display area 950 as a background main display. In this example, the background main display presents a video of a woman whose image is being captured by a camera of the remote user's device. One of ordinary skill will realize that the transitional second stage 935 shown in FIG. 9 is simply one exemplary approach used by some embodiments, and that other embodiments might animate the transitional second stage 935 differently or move directly from stage 930 to stage 940 (or similar states) without animation.

The third stage 940 illustrates the GUI 100 after the animation of the transitional state illustrated in stage 935 has ended. Specifically, the third stage 940 illustrates the PIP display presented by the GUI 100 of some embodiments during the video conference. As mentioned above, this PIP display includes two video displays: the remote video display area 950 as the larger background main display and the local video display area 110 as a smaller foreground inset display.

The third stage 940 also illustrates three selectable UI items 955, 960, and 965 at the bottom of the composite display area 105. The selectable UI item 955 enables the local user to mute the video conference. The selectable UI item 960 enables the local user to end the video conference anytime during the video conference session. The selectable UI item 965 enables the local user to expand the composite display area to occupy the entirety of the display screen of the local user's device.

Different embodiments may allow the user to select these selectable items in different ways (e.g., click operations with a cursor controller, touchscreen operations, etc.). In addition, the options represented by the selectable items (mute, full screen display, end conference) may be selected through other mechanisms as well in some embodiments (e.g., as a menu option, through a voice command or set of keystrokes, etc.).

Some embodiments may allow these selectable UI items to fade away during the video conference, thereby eliminating any potential obstructions to the view of the remote user. The options may then reappear in the composite display area in response to input from the local user (e.g., movement of a cursor controller, a click operation, a touchscreen operation, etc.), thereby giving the user access to the selectable UI items. In addition, some embodiments include different sets of selectable items in the display area (e.g., more items, fewer items, different items). For example, an "attach file" item could be presented that allows the local user to send a file (document, audio file, etc.) to the remote user. As another example, some embodiments may include a "swap" item that enables the local user to swap the two displays in the PIP display (i.e., a selection of the swap item will cause the video conferencing application to display the local video display area as the background main display and the remote video display area as the foreground inset display). Moreover, some embodiments may also include a "switch camera" item that enables the user to switch to a different camera for capturing that user's video.

In some embodiments, the user may move the inset display to a new location in the composite display area (e.g., with a click-and-drag operation on the interior of the display) or modify the size of the inset display (e.g., with a click-and-drag operation on the edge of the display). Some embodiments put restrictions on the size and/or shape (e.g., to maintain the aspect ratio of the display and prevent the display from being too small or too large).

One of ordinary skill will recognize that the PIP display illustrated in FIG. 9 is only one manner of presenting a composite view of the videos being captured at the remote and local devices. For instance, some embodiments allow the local and remote videos to appear in the GUI in two side-by-side display areas (e.g., left and right display windows, or top and bottom display windows) or two diagonally aligned display areas. The manner of the PIP display or a default display mode may be specified by the user in some embodiments through preference settings of the device (or video conferencing application) or through controls that the user can select during a video conference.

Figure 10:
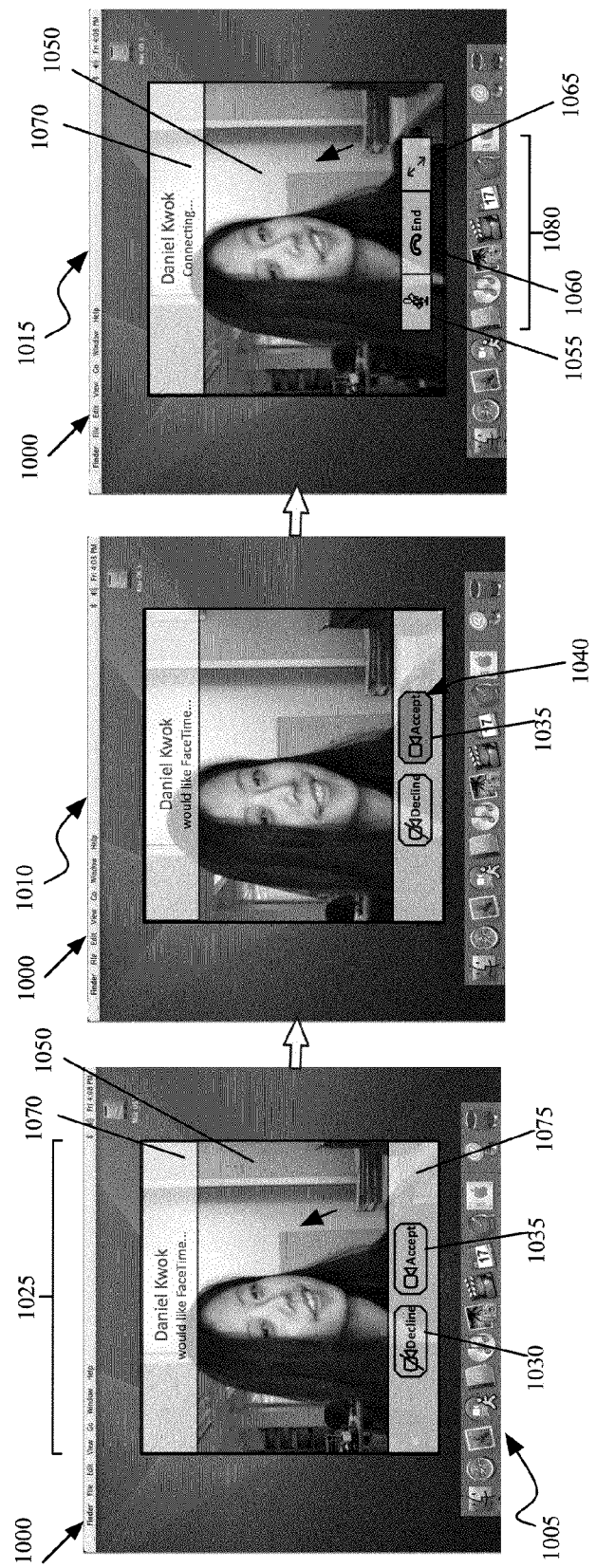
FIG. 10 illustrates a connection sequence in a GUI of some embodiments of an invite recipient's device in which videos are displayed in a landscape orientation.
Figure 11:
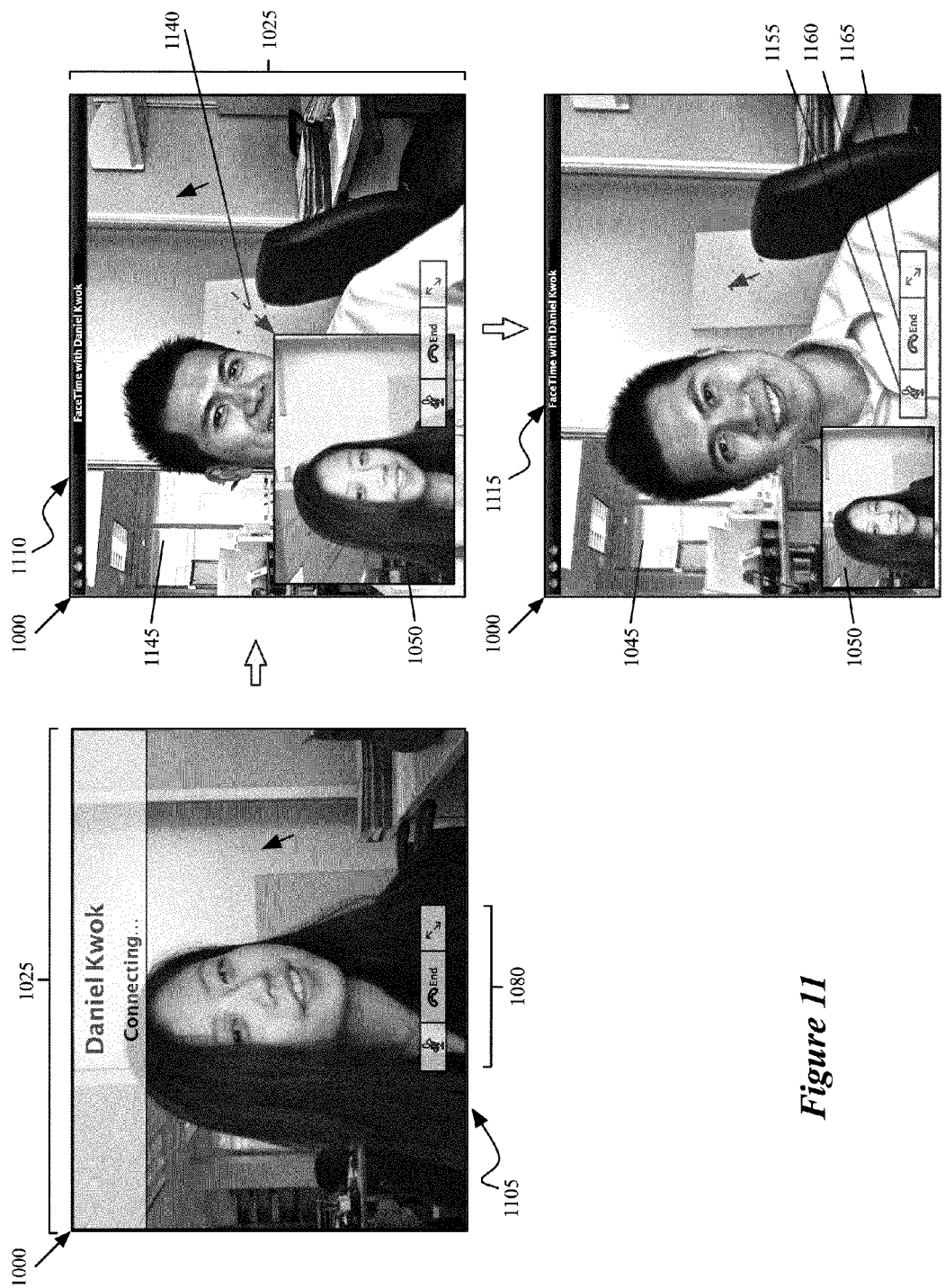
FIG. 11 illustrates a GUI of some embodiments of the completion of the connection sequence illustrated in FIG. 10.
Figure 12:
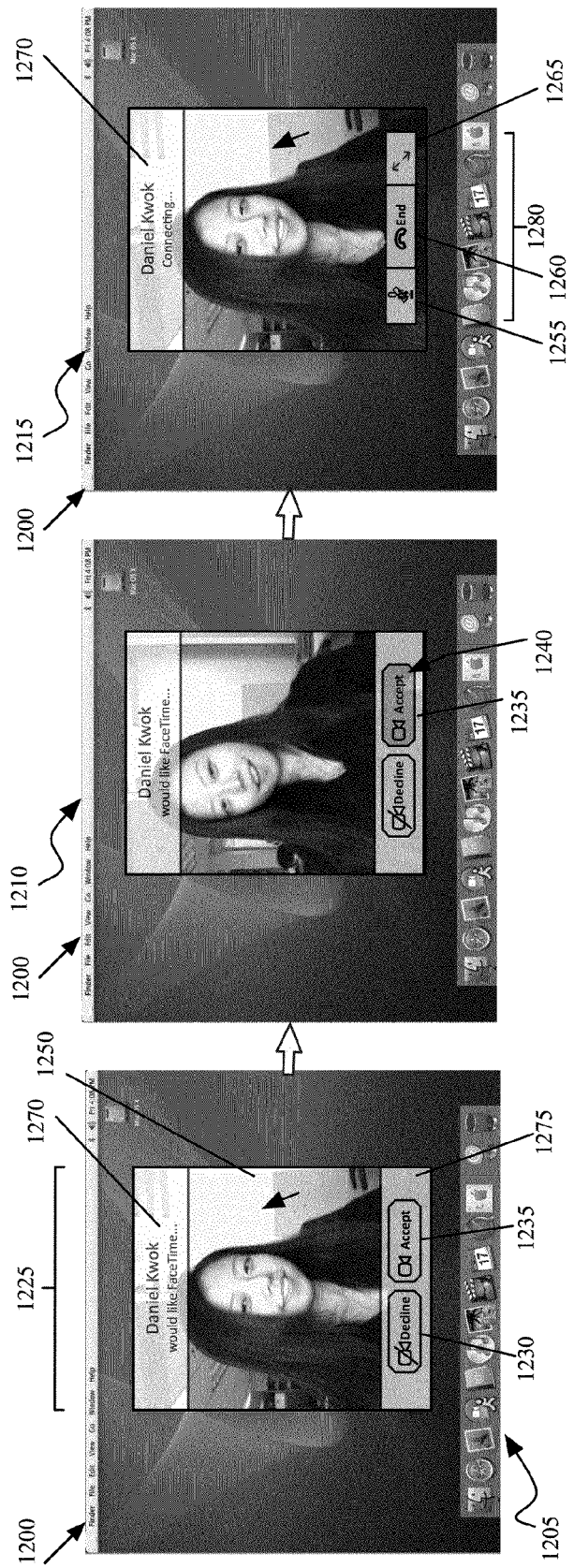
FIG. 12 illustrates a connection sequence in a GUI of some embodiments of an invite recipient device in which videos are displayed in a portrait orientation.
Figure 13:
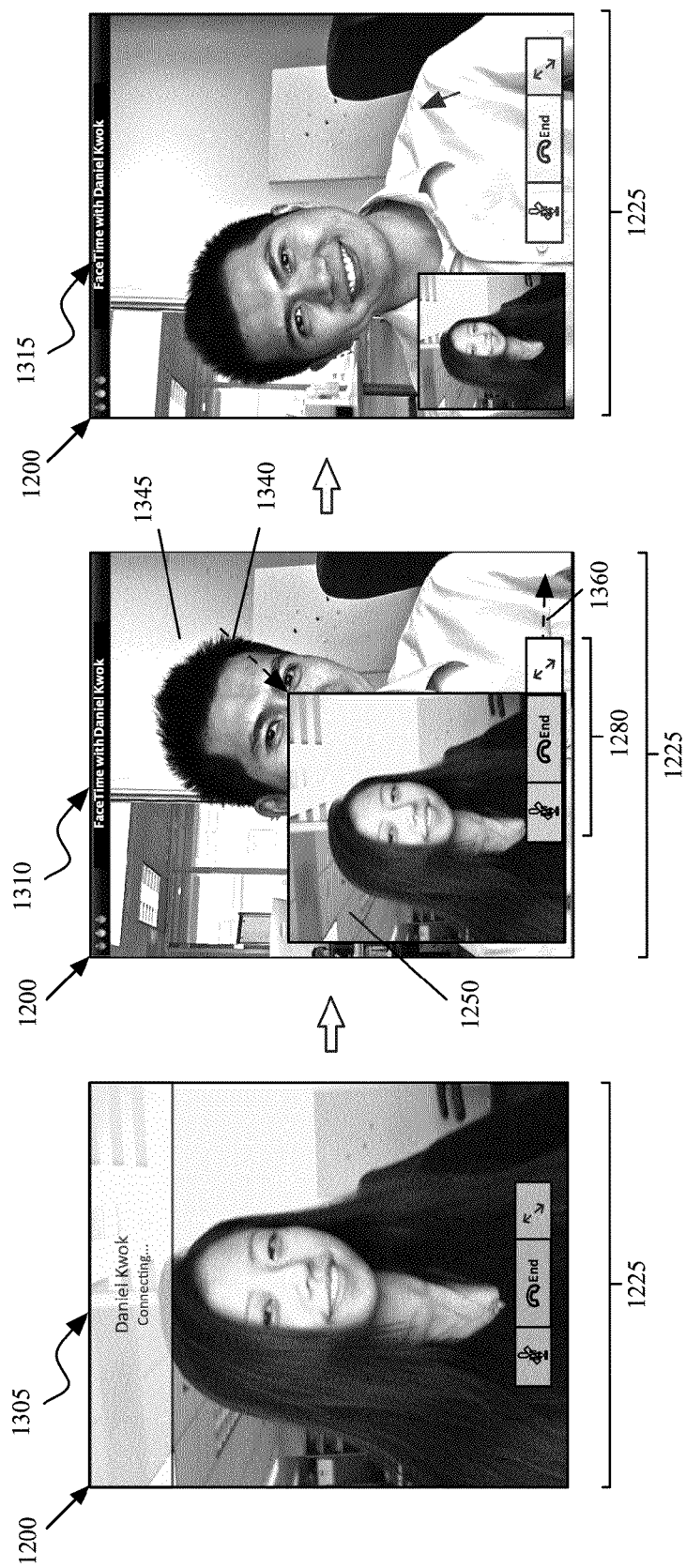
FIG. 13 illustrates a GUI of some embodiments of the completion of the connection sequence illustrated in FIG. 12.

While FIG. 9 illustrated the connection sequence as displayed on the device of the local user (inviting party), FIGS. 10-12 illustrate two examples of a similar connection sequence as displayed on the device of the remote user (invited party). When a local user invites a remote user to a video conference, the remote user may accept, reject, or not respond to the invitation. FIG. 10 illustrates three stages 1005-1015 of a GUI 1000 of the device of the invited party (i.e., the invite recipient device) in which the application displays a preview video of the invited party in landscape orientation. FIG. 11 illustrates three stages 1105-1115 showing a portion of the GUI 1000 after the invited party accepts the video conference invitation. FIGS. 12 and 13 illustrate a similar connection sequence in a GUI 1200 of the invite recipient device in which the videos are displayed in a portrait orientation.

In some embodiments, the user of the video conferencing application may specify the default orientation for the displayed video (either the local video, the remote video, or both). In FIG. 10, the default orientation is landscape whereas the default orientation in FIG. 12 is portrait. Some embodiments allow the user to change the display orientation of a video display at any time during usage of the video conferencing application by selecting a particular UI item on the display screen, by shifting the capturing camera, etc. Some embodiments also allow the user to lock in a specific display orientation, thereby hindering any change in the display orientation of the videos due to camera movement or device movement.

The first stage 1005 in FIG. 10 illustrates the GUI 1000 when the invite recipient receives an invitation to a video conference from the invite requestor (in this case, from Daniel Kwok). At this stage, the GUI 1000 includes a composite display area 1025, as well as a dock and other aspects of a desktop (in this case, a Mac OS X® desktop). In some embodiments, the composite display area appears automatically upon the device's receipt of the video conference invitation. The composite display area 1025 includes a local video display area 1050 and two overlay display areas 1070 and 1075. The local video display area 1050 displays images captured by a camera at the invite recipient device. The overlay display area 1070 displays a message to the user of the device indicating the name of the party that initiated the video conference (or a phone number or other contact information for the party) and that party's desire to establish a video conference. The overlay display area 1075 displays two selectable UI items 1030 and 1035 that allow the user to decline or accept the video conference request, respectively.

In this example, the local video display area 1050 displays a video of a woman whose image is being captured by a camera at the invite recipient device. Upon receiving the invitation, some embodiments automatically begin displaying the video images captured by a local camera coupled to the invite recipient device. This enables the user to preview the video that will be transmitted to the invite requestor device and make adjustments to the camera (e.g., zoom level, direction, etc.), her appearance, the environment, etc. Some embodiments display an indicator to indicate that the invite recipient device is in preview mode and not yet transmitting video. Some embodiments allow the invite recipient to designate a particular camera as the default camera for the start of the video conference, or to select from among multiple cameras before beginning the video conference.

Some embodiments, rather than capturing and displaying video, display a still image or an icon at this stage. In addition, different embodiments use different GUIs for the invitation notification. For example, some embodiments display only the information shown here in the two overlay display areas in a small display area that pops up in the corner of the screen rather than a large display area with video that occupies most of the screen real estate, or preview the video in a smaller display area.

Upon seeing the GUI indicating the video conference request, the user may decline or accept the request by selecting the Decline selectable item 1030 or Accept selectable item 1035. The second stage 1010 illustrates the situation in which the user selects the Accept item 1035. In this example, this user makes the selection by clicking the item 1035 via a cursor 1040, and the GUI indicates the selection by highlighting the item. In some embodiments, the user may select item 1035 through a touchscreen selection or other selection operation. Also, the selection may be indicated differently in some embodiments (e.g., by highlighting the border or text of the item, etc.).

When the user accepts the invitation, the invite recipient's device begins to establish a video conference connection with the invite requestor's device. This connection stage 1015 is indicated to the invite recipient through the overlay display area 1070 displaying "Daniel Kwok" and "Connecting . . . " to show that the invite requestor and recipient are in the process of establishing a connection. In different cases, the connection establishment may take different amounts of time from nearly instantaneous to a few seconds or a minute, depending on various factors (e.g., the devices' connection speed, the amount of data to exchange, network usage factors, etc.).

At this stage, the video conferencing application no longer displays the overlay display area 1075 and instead displays an overlay display area 1080 that includes selectable UI items 1055-1065. The selectable UI items 1055-1065 are comparable to the items 955-965 described above, and enable the user to mute the video conference, end the video conference, or expand the composite display area to occupy the entirety of the display screen of the local user's device. Different embodiments may allow the user to select these selectable items in different ways (e.g., click operations with a cursor controller, touchscreen operations, etc.). In addition, the options represented by the selectable items (mute, end conference, and expand) may be selected through other mechanisms as well in some embodiments (e.g., as a menu option, through a voice command or set of keystrokes, etc.).

Some embodiments may allow these selectable UI items to fade away during the video conference, thereby eliminating any potential obstructions to the view of the remote user. The options may then reappear in the composite display area in response to input from the local user (e.g., movement of a cursor controller, a click operation, a touchscreen operation, etc.), thereby giving the user access to the selectable UI items. As mentioned, above, some embodiments also include more, fewer, or different selectable items in the display.

FIG. 11 illustrates the completion of the connection sequence in three stages 1105-1115 that show only the composite display area 1025 of GUI 1000. The first stage 1105 shows the composite display area 1025 at the third stage 1015 of FIG. 10, at which point the video conferencing application is waiting for the establishment of a connection with the inviting party's device.

In the second stage 1110, the composite display area 1025 now displays a remote video display area 1145 in addition to the local video display area 1050. The local video display area 1050 displays the video images of the local user (captured by a camera at the invite recipient device). As shown at this stage, in some embodiments the local video display area 1050 initially has the same size as in the first stage 1025, then gradually decreases in size (i.e., gradually shrinks) as indicated by the arrow 1140. As the local video display area 1050 shrinks, the majority of the composite display area 1025 is replaced by a remote video display area 1145 that displays images captured by a camera of the invite requestor device.

In other words, the shrinking of the local video display area 1050 creates a PIP display that includes the local video display area 1050 as a foreground inset display and the remote user video display area 1145 as a background main display. In this example, the background main display presents a video of a man whose image is being captured by a camera of the remote invite requestor device. One of ordinary skill will realize that the transitional second stage 1110 shown in FIG. 11 is simply one exemplary approach used by some embodiments, and that other embodiments might animate the transitional second stage 1110 differently or move directly to stage 1115 (or similar states) without animation.

The third stage 1115 illustrates the GUI 1000 after the animation of the transitional state illustrated in stage 1110 has ended. Specifically, the third stage 1115 illustrates the PIP display presented by the GUI 1000 of some embodiments during the video conference. As mentioned above, this PIP display includes two video displays: the remote video display area 1145 as the larger background main display and the local video display area 1050 as a smaller foreground inset display.

As illustrated in examples below, in some embodiments, the user may move the inset display to a new location in the composite display area (e.g., with a click-and-drag operation on the interior of the display), modify the display orientation of the inset display (e.g., by selecting a selectable UI item), or modify the size of the inset display (e.g., with a click-and-drag operation on the edge of the display). Some embodiments put restrictions on the size and/or shape (e.g., to maintain the aspect ratio of the display and prevent the display from being too small or too large).

One of ordinary skill will recognize that the PIP display illustrated in FIG. 11 is only one manner of presenting a composite view of the videos being captured at the remote and local devices. For instance, some embodiments allow the local and remote videos to appear in the GUI in two side-by-side display areas (e.g., left and right display windows, or top and bottom display windows) or two diagonally aligned display areas. The manner of the PIP display or a default display mode may be specified by the user in some embodiments through preference settings of the device (or video conferencing application) or through controls that the user can select during a video conference.

FIGS. 10 and 11 illustrate the connection sequence displayed on the invite recipient's device in the case in which the videos are displayed in landscape orientation. FIGS. 12 and 13 illustrate the same connection sequence displayed in the case in which both videos are displayed in portrait orientation.

The first stage 1205 in FIG. 12 illustrates the GUI 1200 when the invite recipient receives an invitation to a video conference from the invite requestor. At this stage, the GUI 1200 includes a composite display area 1225, as well as a dock and other aspects of a desktop (in this case, a Mac OS X® desktop). In some embodiments, the composite display area appears automatically upon the device's receipt of the video conference invitation. In this example, the composite display area 1225 has a portrait orientation, as opposed to the landscape orientation shown in FIG. 10.

The composite display area 1225 includes a local video display area 1250 and two overlay display areas 1270 and 1275. The local video display area 1250 displays images captured by a camera at the invite recipient device. The overlay display area 1270 displays a message to the user of the device indicating the name of the party that initiated the video conference (or a phone number or other contact information for the party) and that party's desire to establish a video conference. The overlay display area 1275 displays two selectable UI items 1230 and 1235, similar to selectable UI items 1030 and 1035, that allow the user to decline or accept the video conference request, respectively.

In this example, the local video display area 1250 displays a video of a woman whose image is being captured by a camera at the invite recipient device. Upon seeing the GUI indicating the video conference request, the user may decline or accept the request by selecting the Decline selectable item 1230 or Accept selectable item 1235. The second stage 1210, as with the second stage 1010 shown above, illustrates the situation in which the user selects the Accept item 1235. In this example, this user makes the selection by clicking the item 1235 via a cursor 1240, and the GUI indicates the selection by highlighting the item. In some embodiments, the user may select item 1235 through a touchscreen selection or other selection operation. Also, the selection may be indicated differently in some embodiments (e.g., by highlighting the border or text of the item, etc.).

When the user accepts the invitation, the invite recipient's device begins to establish a video conference connection with the invite requestor's device, as described above. This connection stage 1215 is indicated to the invite recipient through the overlay display area 1270 displaying "Daniel Kwok" and "Connecting . . . " to show that the invite requestor and recipient are in the process of establishing a connection.

At this stage, the video conferencing application no longer displays the overlay display area 1275 and instead displays an overlay display area 1280 that includes selectable UI items 1255-1265. The selectable UI items 1255-1265 are comparable to the items 955-965 described above, and enable the user to mute the video conference, end the video conference, or expand the composite display area to occupy the entirety of the display screen of the local user's device.

FIG. 13 illustrates the completion of the connection sequence in three stages 1305-1315 that show only the composite display area 1225 of GUI 1200, which is still in a portrait orientation. The first stage 1305 shows the composite display area 1225 at the third stage 1215 of FIG. 12, at which point the video conferencing application is waiting for the establishment of a connection with the inviting party's device.

In the second stage 1310, the composite display area 1225 now displays a remote video display area 1345 in addition to the local video display area 1250. The local video display area 1250 displays the video images of the local user (captured by a camera at the invite recipient device). As shown at this stage, in some embodiments the local video display area 1250 initially has the same size as in the first stage 1305, then gradually decreases in size (i.e., gradually shrinks) as indicated by the arrow 1340. As the local video display area 1250 shrinks, the majority of the composite display area 1225 is replaced by a remote video display area 1345 that displays images captured by a camera of the invite requestor device. As with the local video display area 1250, the remote video display area 1345 has a portrait orientation in this example. In some embodiments, the orientation of the remote video display area 1345 is determined by the remote user (e.g., by orientation of the camera, a setting selected by the remote user, etc.).

As in FIG. 11, the shrinking of the local video display area 1250 creates a PIP display that includes the local video display area 1250 as a foreground inset display and the remote user video display area 1345 as a background main display. In this example, the background main display presents a video of a man whose image is being captured by a camera of the remote invite requestor device. One of ordinary skill will realize that the transitional second stage 1310 shown in FIG. 13 is simply one exemplary approach used by some embodiments, and that other embodiments might animate the transitional second stage 1310 differently or move directly to stage 1315 (or similar states) without animation.

Moreover, as shown in this second stage 1310, the overlay display area 1280 starts to move from the bottom center of the composite display 1225 to the lower right corner of this display, as indicated by the arrow 1360. In some embodiments, the overlay display area moves towards the lower right corner of the composite display when the composite display area 1225 is in portrait orientation, as the horizontal real estate of the display area is narrower and has to fit both the overlay display area 1280 and the local video display area 1250.

The third stage 1315 illustrates the GUI 1200 after the animation of the transitional state illustrated in stage 1310 has ended. Specifically, the third stage 1315 illustrates the PIP display presented by the GUI 1200 of some embodiments during the video conference. As mentioned above, this PIP display includes two video displays: the remote video display area 1345 as the larger background main display and the local video display area 1250 as a smaller foreground inset display.

Figure 14:
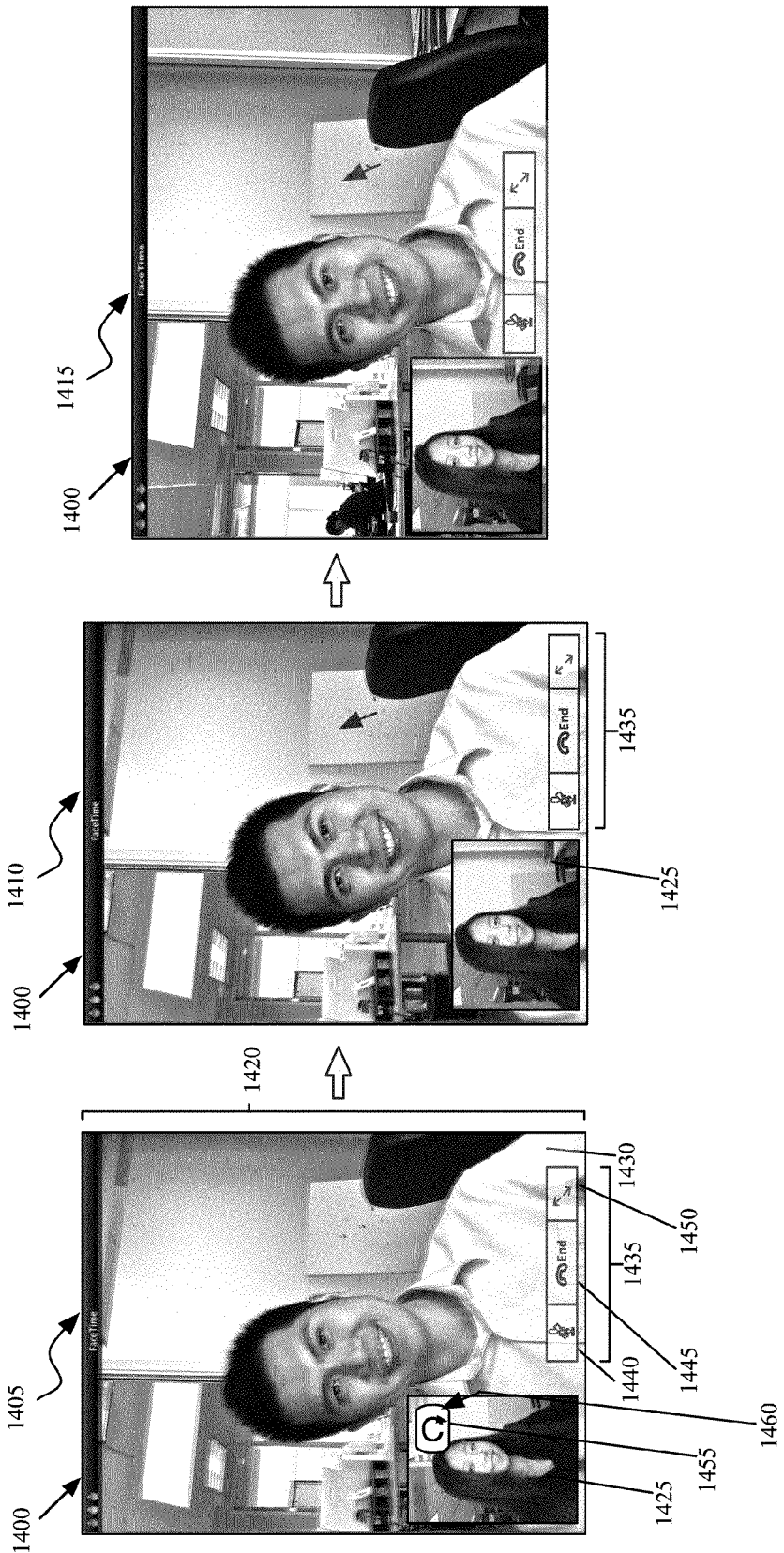
FIG. 14 illustrates a GUI of some embodiments of changing a display orientation of both local and remote video display areas during a video conference.
Figure 15:
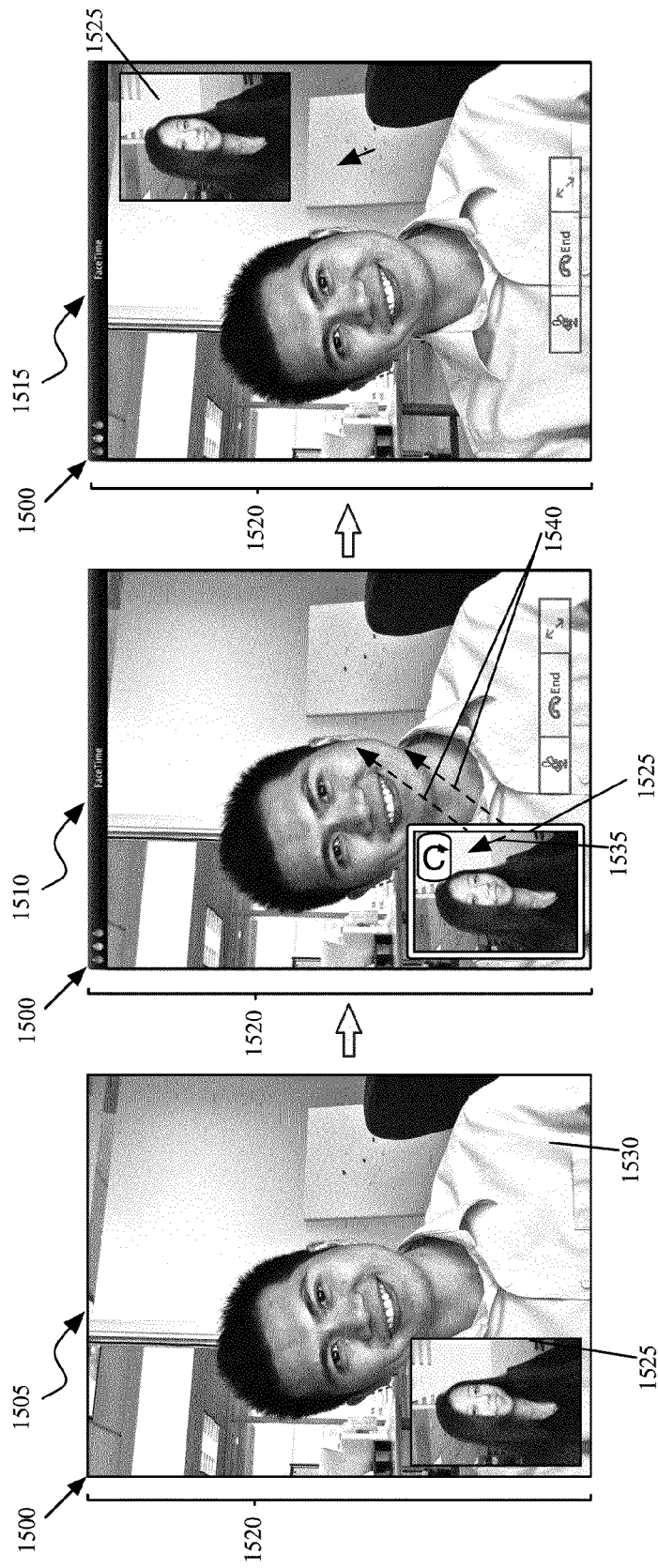
FIG. 15 illustrates a GUI of some embodiments of modifying a PIP display by movement of an inset display.
Figure 16:
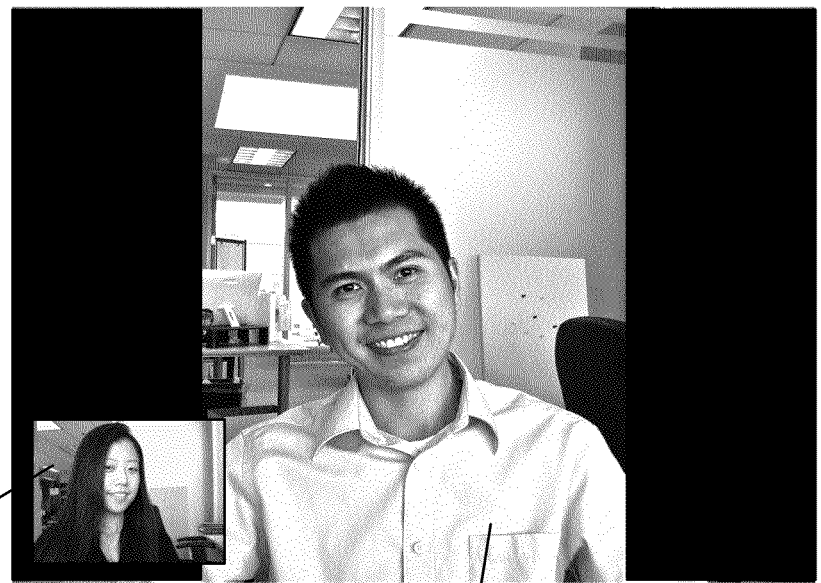
FIG. 16 illustrates an example of full screen display of a video conferencing application GUI.
Figure 17:
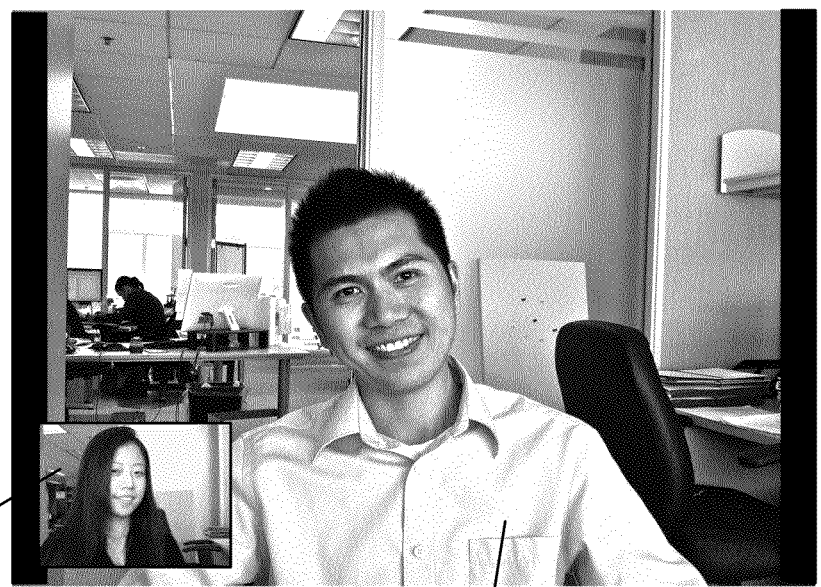
FIG. 17 illustrates another example of full screen display of a video conferencing application GUI.

FIGS. 10-13 illustrate examples of a GUI of a video conferencing application during the establishment of a video conference. The following FIGS. 14-16 illustrate different aspects of the GUI displaying video of both parties during the video conference. Specifically, FIG. 14 illustrates changing the display orientation of both local and remote video display areas during a video conference. FIG. 15 illustrates that during a video conference, the user can modify a PIP display by moving the inset display. FIGS. 16 and 17 each illustrate an example of full screen display of the video conferencing application GUI.

FIG. 14 illustrates three stages 1405-1415 of a video conferencing application GUI 1400 that starts with both the local and remote video displays in portrait orientation and ends with both displays in landscape orientation. In some embodiments, a user of the video conferencing application may change the display orientation of one or both of the video display areas anytime during the video conference. In some cases, the user may want to change the display orientation of a locally captured video from portrait to landscape so that the video transmitted to another participant of the video conference can encompass a broader lateral view. In other cases, the user may want to switch the display orientation from landscape to portrait so that the video transmitted to another participant of the video conference can encompass a broader longitudinal view. The user may also wish to switch the display orientation for purposes of better utilizing screen real estate, or other reasons.

The first stage 1405 illustrates a composite display area 1420 that is similar to the composite display area 1225 shown in the third stage 1315 of FIG. 13. The composite display area 1420 includes an overlay display area 1435 and a PIP display of a local video display area 1425 and a remote video display area 1430. The local video display area 1425 is shown in the foreground inset display of the PIP display, whereas the remote video display area 1430 is shown in the background main display of the PIP display in this example. At this stage, both of the video display areas are displayed in a portrait orientation.

The overlay display area 1435 includes selectable UI items 1440-1450, which are comparable to the items 955-965 described above, and enable the user to mute the video conference, end the video conference, or expand the composite display area to occupy the entirety of the display screen of the user's device. Different embodiments may allow the user to select these selectable items in different ways (e.g., click operations with a cursor controller, touchscreen operations, etc.). In addition, the options represented by the selectable items (mute, end conference, expand) may be selected through other mechanisms as well in some embodiments (e.g., as a menu option, through a voice command or set of keystrokes, etc.).

The GUI 1400 at stage 1405 also displays a selectable item 1455 over the local video display area 1425. In some embodiments, when a user places a cursor over a portion of the GUI (e.g., anywhere in the composite display area, anywhere in the local video display area, etc.), the video conferencing application displays a selectable item that enables the user to toggle the orientation of the local video display area. Some embodiments also display such a selectable UI item when a user touches the particular portion of a GUI.

This stage illustrates the selection of the UI item 1455 via a cursor 1460. In some embodiments, the user performs this selection by touching the screen at the location of the selectable item for this contact, by using a cursor controller to position a cursor over the selectable item and performing a selection operation with the cursor controller, by issuing a voice command, etc.

The second stage 1410 of FIG. 14 illustrates that after the user selects UI item 1455, the local video display area 1425 rotates from portrait orientation to landscape orientation. The overlay display area 1435 shifts to the right to give the local video display area 1425 ample space for display, as described above. In this example, the user chooses to rotate the orientation of the local video display by selecting a UI item. Some embodiments change the display orientation of the local video display area automatically when a user rotates the capturing device or camera.

The third stage 1415 illustrates the result of actions by the remote user. In some embodiments, when the remote user modifies his display orientation (e.g., through a selection of a UI item), the video received by the local user is now in a different orientation and the video conferencing application therefore displays the video in the new orientation. In some embodiments, the remote user may also rotate his device (e.g., a camera connected to a computer, an iPhone or other smartphone, etc.) or change a capture setting on his device in order to switch the orientation. For example, if a local user on a desktop computer is engaged in a video conference with a remote user on an iPhone, when the remote user rotates his iPhone ninety degrees, the orientation of the remote video display on the desktop computer will be modified. In this third stage 1415, the remote user has switched his video display to landscape orientation, and thus the video is displayed in landscape orientation in GUI 1400.

While the above three stages show the two video displays (local and remote) in portrait/portrait, landscape/portrait, and landscape/landscape orientation, one of ordinary skill in the art will recognize that some embodiments will also allow the local video display to be shown in portrait orientation while the remote video display is shown in landscape orientation.

In some embodiments, whether displaying video in portrait or landscape orientation, the video conferencing application allows a user to modify a composite display by moving around one or more display areas that form the composite display. For example, a user may move an inset display area of a PIP display to different locations in the composite display. FIG. 15 illustrates an example of such movement of a foreground inset display area during a video conference. While participating in a video conference, a user may want to move a foreground inset display area for a variety of reasons, such as when this display area blocks an area of interest of the background display area.

FIG. 15 illustrates the movement of an inset display area 1525 in a composite display area 1520 by reference to three different stages 1505-1515 of a GUI 1500. The first stage 1505 illustrates the GUI 1500 during a video conference between a local user and a remote user. The GUI 1500 shows a PIP display that is similar to the PIP display shown in the first stage 1405 of FIG. 14. In this example, the video captured by the remote user's device is displayed in the inset display area 1525 and the video captured by the remote user's device is displayed in the background display area 1530. As the user is not interacting with the GUI at this stage (e.g., the cursor has not been moved over the GUI), no selectable items are displayed (e.g., the mute, end conference, expand, or rotate display items).

The second stage 1510 illustrates the user starting a movement of the inset display area 1525 by selecting the inset display area and beginning to move the inset display area up and to the right. In this example, a selection is made by selecting the inset display area 1525 via a cursor 1535. Different embodiments may allow the user to select a display area in different ways (e.g., click operations with a cursor controller, touchscreen operations, etc.). As shown, this selection is displayed in terms of a thick border for the inset display area 1525. Different embodiments may indicate such a selection in different ways, such as by highlighting the display area, by causing the display area to vibrate, etc. Some embodiments, though, do not display an indicator of the selection.

The user begins to move the inset display area 1525 from one area in the PIP display 1520 to another area in this display. In this example, the inset display area 1525 starts to move from the lower left corner of the PIP display 1520 to the upper right corner, as indicated by the arrows 1540. In this example, the inset display area 1525 is moved by dragging the cursor 1535 towards the upper right corner of the PIP display 1520 after selecting the inset display. Some embodiments provide other techniques for moving the inset display area around in the PIP display (e.g., touchscreen drag and drop operations).

The third stage 1515 illustrates the GUI 1500 after the inset display area 1525 has reached its new location at the upper right corner of the PIP display 1520. The removal of the thick border indicates that the movement is completed and the inset display area is no longer selected. As the user has moved the cursor off of the inset display area, the selectable item for rotating the inset is no longer displayed. However, the overlay display area with the mute, end, and expand items is still displayed as the cursor remains over the composite display area.

When moving an inset display area, some embodiments employ snapping rules that allow the inset display area to quickly snap to a corner of the PIP display once the user causes the inset display area to move towards that corner. For instance, when the user drags the inset display area by more than a threshold amount towards a particular corner, the video conferencing application identifies the direction of motion of the inset display area, determines that the motion has exceeded a threshold amount, and then subsequently moves the inset display area automatically without further user input to a grid point in the composite display area to which the inset display area can be snapped. In some embodiments, grid points are provided for snapping the inset display area only at the four corners of the PIP display. Other embodiments provide additional grid points in the composite display area to which the inset display area can snap (e.g., along the edges of the composite display area).

Still other embodiments may not employ grid points so that the inset display area can be positioned at any point in the PIP display. Some embodiments provide a feature that allows the user to turn on or off the snap to grid point feature of the video conferencing application.

The above examples of the video conferencing application display during a video conference a GUI that is a window within a larger display (e.g., a computer desktop). In some embodiments, a user may operate the application in full-screen mode during a video conference. FIGS. 16 and 17 illustrates examples of such a full-screen display for a standard aspect ratio display screen in both portrait and landscape orientations.

FIG. 16 illustrates a full-screen display with the remote video display 1605 in portrait orientation. In this example, because the screen has an aspect ratio closer to a landscape orientation, the remote video display 1605 occupies the entire vertical height of the screen while large black bars are displayed on either side of the remote video display. The inset video display 1610 is displayed in the bottom left corner of the screen, only minimally covering a portion of the remote video display 1605.

FIG. 17, on the other hand, illustrates a full-screen display with the remote video display 1705 in landscape orientation. In this case, the black bars are much smaller as the remote video display 1705 occupies most of the screen. The inset video display 1710 is again displayed in the bottom left corner of the screen, covering more of the remote video display in this example.

IV. Configuring the Favorites List

As mentioned above in Section II, one of the configuration processes performed through the overlay display area of some embodiments is the configuration of a favorites list (i.e., a list of the user's favorite contacts) of the video conferencing application. Through the overlay display area, a user can configure the favorites list by adding, deleting, or modifying the contacts listed in the favorites list. Although the examples illustrated in FIGS. 18-21 relate to configuring the favorites list, the user may also make similar modifications to other lists of contacts (e.g., adding new contacts, removing a contact from the recents list, etc.).

A. Adding a Contact to a Favorites List

Figure 18:
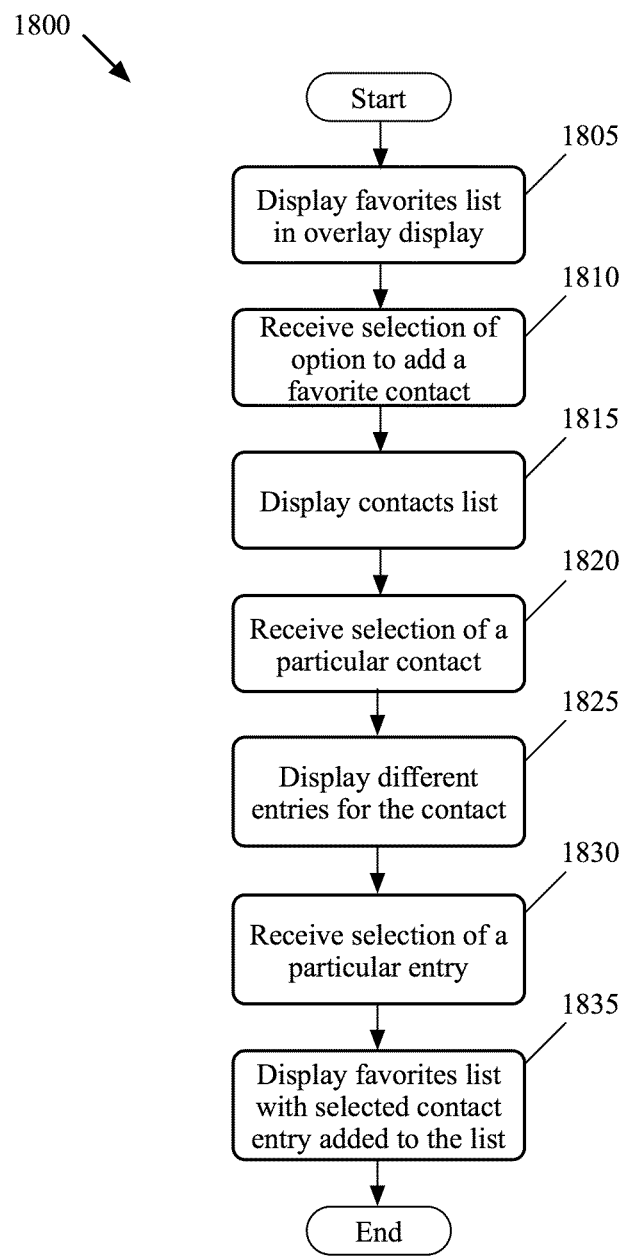
FIG. 18 conceptually illustrates a process of some embodiments for adding a contact to a favorites list of a video conferencing application.

FIG. 18 conceptually illustrates a process 1800 of some embodiments for adding a contact to a favorites list of a video conferencing application. One of ordinary skill will recognize that the process 1800 may be performed at operation 540 of process 500 in some embodiments. The process 1800 will be described by reference to FIG. 19, which illustrates an example of a user performing such an addition operation through the overlay display area of a video conferencing application of some embodiments.

Figure 19:
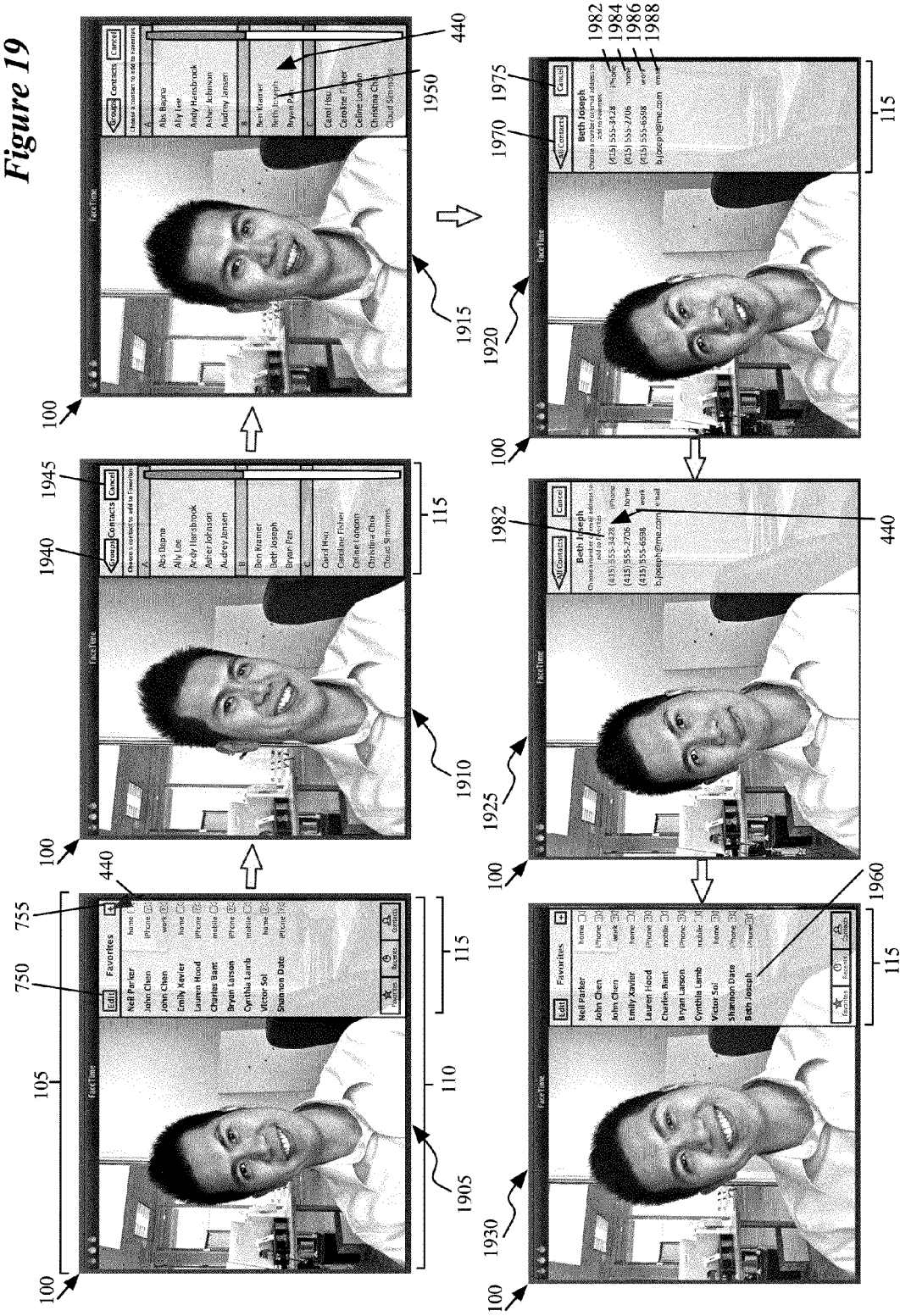
FIG. 19 illustrates a GUI of some embodiments of a user adding a contact to a favorites list displayed in an overlay display area.

FIG. 19 illustrates a user adding a contact to a favorites list displayed in an overlay display area through six stages 1905-1930 of the GUI 100. The first stage 1905 illustrates the composite display area 105, which includes the local video display area 110 and the overlay display area 115 transparently superimposed over the local video display area. The overlay display area 115 is currently displaying the favorites list of the local user.

In some embodiments, the favorites list includes a selectable item for each contact in the favorites list, as described above by reference to FIG. 7. In addition, the overlay display area displays selectable UI items 750 and 755. The selectable item 750 enables a user to remove a contact from the favorites list or modify a contact in the favorites list. The selectable item 755 enables a user to add a contact to the favorites list.

As shown in FIG. 18, the process 1800 begins by displaying (at 1805) a favorites list in an overlay display area. In some embodiments, as shown in the previous examples, the overlay display area is a translucent display area that is superimposed over a video display (e.g., a video of the local user).

The process 1800 then receives (at 1810) a selection of an option to add a favorite contact. The selection may be received through a selection of a UI item, a selection of a menu option, a hotkey or set of keystrokes, etc. The user may want to add a particular contact from the user's full contacts list to the favorites list to give the user easier access to the particular contact. As the favorites list will generally be shorter than the full contacts list, the user will be able to search through a shorter and more manageable list of contacts in order to find the particular contact in the future.

The first stage 1905 of FIG. 19 illustrates a user selecting the selectable UI item 755. As described above, selection of UI item 755 allows the user to add a contact to the favorites list. This example illustrates the selection of item 755 via the cursor 440. For instance, the user might place the cursor over the selectable UI item and enter selection input through a cursor controller. As described above, other embodiments may allow the user to select the item directly through a touchscreen, etc.

Next, the process 1800 displays (at 1815) the user's full list of contacts in the overlay display area. In some embodiments, the contacts list displays all the contacts retrieved from the user's address book, as described above. In other embodiments, the contacts list displays all the contacts retrieved from the user's address book that have the capability to participate in a video conference.

The second stage 1910 of FIG. 19 illustrates that upon the user's selection of the selectable UI item 755, the video conferencing application modifies the overlay display area 115 so that the overlay display area now displays the user's full contacts list. In addition to displaying the full list of contacts (as in the contacts list shown in FIG. 1), the overlay display area 115 also displays two selectable UI items 1940 and 1945. Selection of the selectable UI item 1940 of some embodiments displays a list of groups of contacts, if the user has setup such groups (e.g., friends, family, co-workers, etc.). The user can then select one of these groups in order to view all of the contacts in that group. The selectable UI item 1945 enables the user to cancel the add operation. In some embodiments, selecting the cancel item 1945 causes the overlay display area 115 to return to displaying the favorites list.

In some embodiments, the overlay display area remains superimposed over the video display area when the information displayed in the overlay display area transitions from the favorites list (and its associated components, including selectable items) to the contacts list. In other embodiments, the overlay display area with the favorites list slides off the video display area and then slides back onto the video display area with the full contacts list in an animated fashion. Different embodiments also allow for different animations of the overlay display area. Some embodiments allow the user to specify the animation used (e.g., under a preference setting) in some embodiments.

Returning to FIG. 18, the process 1800 next receives (at 1820) a selection of a particular contact from the contacts list to add to the favorites list displayed in the overlay display area. The selection can be made by selecting a selectable item representing the particular contact (e.g., through a click operation with a cursor controller, a touchscreen operation, etc.) in some embodiments, or through other user interface mechanisms.

The third stage 1915 of FIG. 19 illustrates that the user is selecting a particular contact 1950 ("Beth Joseph") to add to the favorites list. In this example, the user selects the contact 1950 using the cursor 440. However, as mentioned, other selection inputs (e.g., a touchscreen) may be used as well in some embodiments. As shown, the GUI 100 indicates the selection by highlighting the contact during the selection. Different embodiments may indicate such a selection in different ways (e.g., by highlighting the border or the text of the item).

The process 1800 then displays (at 1825) different entries for the contact. As described above by reference to FIG. 7, a contact may have multiple entries with different entry types (e.g., home, iPhone, work, etc.). The different entry types indicate different devices at which the user can reach the contact. Some embodiments only include contact entries capable of video conferencing, while other embodiments include all entries for a contact. In some embodiments, when a user selects a contact entry that is not video conferencing-capable (e.g., a landline phone number), the video conferencing application selects a different entry for the same contact (e.g., an e-mail address).

The fourth stage 1920 of FIG. 19 illustrates that the overlay display area 115 now displays detailed information about the selected contact ("Beth Joseph"). As shown, in some embodiments the overlay display area displays a list of selectable items that represent different ways to reach the contact. In this example, four such selectable items are listed: three items 1982, 1984, and 1986 representing phone numbers (an iPhone, a home phone, and a work phone) as well as an item 1988 representing an e-mail address. Some embodiments include indicators as to whether each of these different entries is capable of participating in a video conference. Two additional selectable items 1970 and 1975 are displayed in the overlay display area 115 as well. Selection of item 1970 brings the user back to the third stage 1915 at which all the contacts are displayed in the overlay display area 115, while selection of the item 1975 cancels the operation to add a favorite and brings the user back to the first stage at which the overlay display area 115 displays the favorites list.

As described above, the transition between the information displayed in the overlay display can be displayed differently in different embodiments. Some embodiments slide the overlay display area with the contacts list off of the video display area in an animated fashion and then slide the overlay display back on displaying the different devices at which the selected contact can be reached.

Returning to FIG. 18, the process 1800 then receives (at 1830) a selection from the user of a particular entry from the contact list that the user would like to add to the favorites list. The user may perform this selection by selecting a selectable item (e.g., one of items 1982-1988 with a cursor controller, via a touchscreen, etc., by pressing a hotkey or series of keystrokes, etc.

The fifth stage 1925 of FIG. 19 illustrates the selection of selectable item 1982 that represents Beth Joseph's iPhone number. As described above in FIG. 7, in order to contact a phone number, some embodiments send a request to the device (i.e., phone) associated with the selected phone number. In this example, the selection is performed using cursor 440 (e.g., with a single click operation). During the selection, the GUI 100 displays the selection by highlighting the selectable item 1982. As described above, different embodiments may display the selection differently (e.g., by highlighting a border of the selectable item, etc.).

The process 1800 then displays (at 1835) the favorites list in the overlay display area with the newly selected contact entry added to the list. Furthermore, the contact entry is now stored in the video conferencing application memory as part of the favorites list. In the sixth stage 1930 of FIG. 19, the overlay display area 115 now displays a selectable item 1960 representing the selected contact entry for Beth Joseph's iPhone as part of the favorites list. The order in which the video conferencing application displays the contact entries in the favorites list can be specified by the user in some embodiments. Some embodiments automatically add a newly selected contact entry to the end of the favorites list by default, while other embodiments automatically add a newly selected contact entry to the list in alphanumeric order.

The illustrated example of FIG. 19 illustrates the case in which the user selects a contact and is presented with multiple contact entries for the selected contact. In some embodiments, when only one entry exists for a selected contact, the contact is added to the favorites list automatically when selected. Thus, if Beth Joseph only had one entry (e.g., the iPhone), then upon selection of selectable item 1950 at stage 1915, Beth Joseph's iPhone would be automatically added to the favorites list (skipping stages 1920 and 1925). Some embodiments allow the user to select a contact entry in such a way (e.g., with a different selection input) that a default entry for a selected contact is added to the favorites list (again skipping stages 1920 and 1925). In addition, when only one of a set of entries for a contact is video conferencing capable, some embodiments automatically add this entry to the favorites list.

B. Removing a Contact from Favorites List

Figure 20:
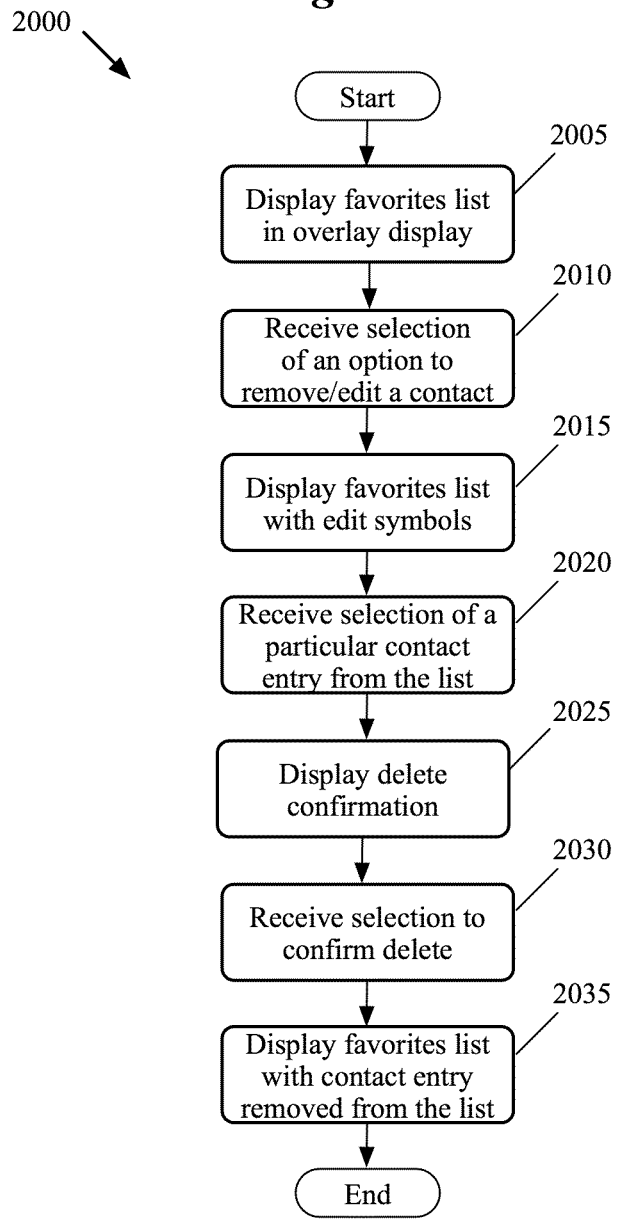
FIG. 20 conceptually illustrates a process of some embodiments for removing a contact from a favorites list of a video conferencing application.

As mentioned, in addition to adding contacts to the favorites list, a user may edit or remove contacts from the list. FIG. 20 conceptually illustrates a process 2000 of some embodiments for removing a contact from a favorites list of a video conferencing application. One of ordinary skill will recognize that the process 2000 may be performed at operation 540 of process 500 in some embodiments. The process 2000 will be described by reference to FIG. 21, which illustrates an example of a user performing such a removal operation through the overlay display area of a video conferencing application of some embodiments.

Figure 21:
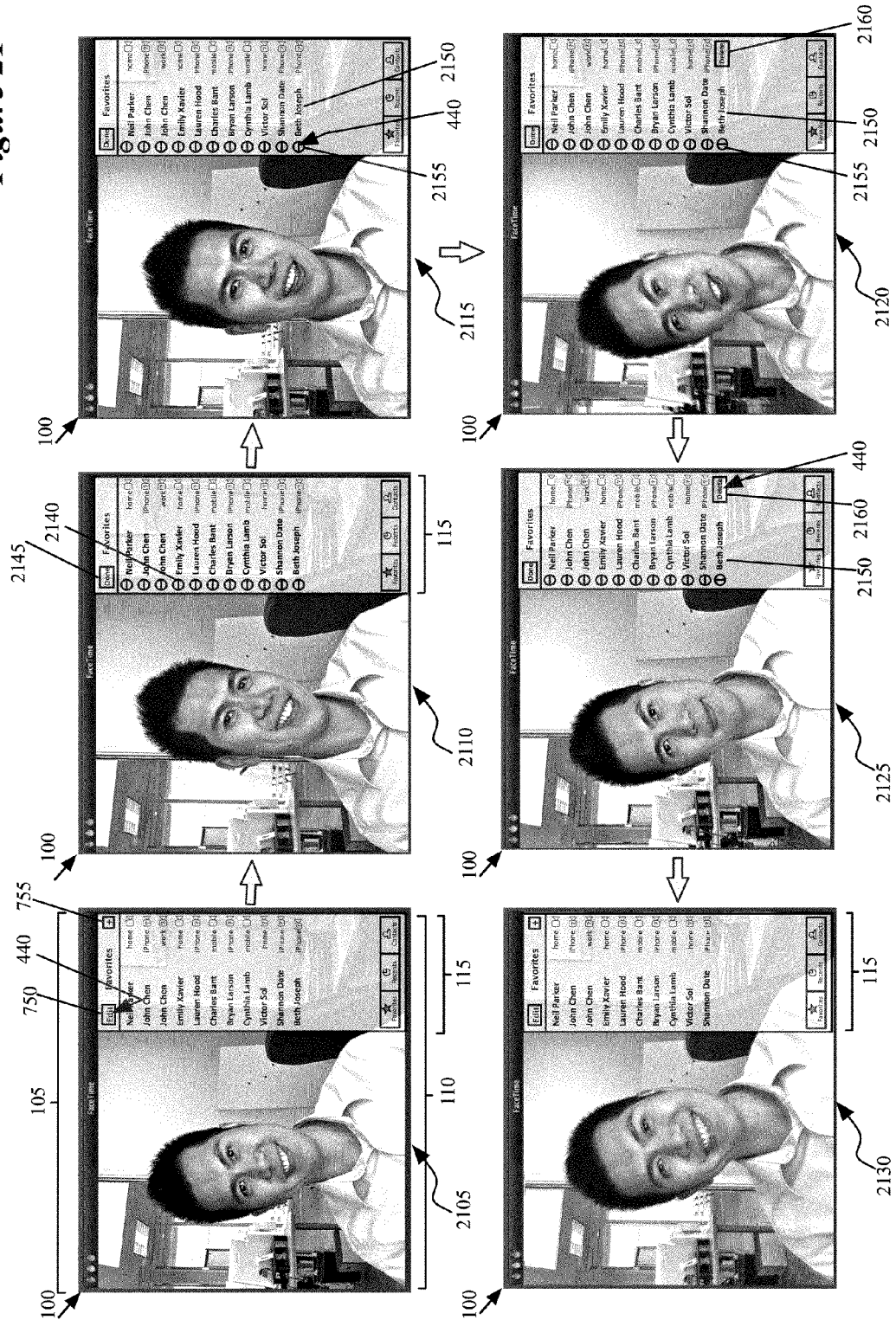
FIG. 21 illustrates a GUI of some embodiments of a user removing a contact from a favorites list displayed in an overlay display area.

FIG. 21 illustrates a user removing a contact from a favorites list displayed in an overlay display area through six stages 2105-2130 of the GUI 100. The first stage 2105 illustrates the composite display area 105, which includes the local video display area 110 and the overlay display area 115 translucently superimposed over the local video display area. The overlay display area 115 is currently displaying the favorites list of the local user.

In some embodiments, the favorites list includes a selectable item for each contact in the favorites list, as described above by reference to FIG. 7. In addition, as also described in FIG. 19, the overlay display area displays selectable UI items 750 and 755. The selectable item 750 enables a user to remove a contact from the favorites list or modify a contact in the favorites list. The selectable item 755 enables a user to add a contact to the favorites list.

As shown in FIG. 20, the process 2000 begins by displaying (at 2005) a favorites list in an overlay display area. In some embodiments, as shown in the previous examples, the overlay display area is a translucent display area that is superimposed over a video display (e.g., a video of the local user).

The process 2000 then receives (at 2010) a selection of an option to edit the favorites list. As described above, the selection may be received through a selection of a UI item, a selection of a menu option, a hotkey or set of keystrokes, etc. Some embodiments use a single edit option that allows the user to either delete a contact entry from the favorites list or modify a contact entry in the favorites list.

The first stage 2105 of FIG. 21 illustrates a user selecting the selectable UI item 750. As described above, selection of UI item 750 allows the user to edit the favorites list. This example illustrates the selection of item 750 via the cursor 440. For instance, the user might place the cursor over the selectable UI item and enter selection input through a cursor controller. As described above, other embodiments may allow the user to select the item directly through a touchscreen, etc.

Next, the process 2000 displays (at 2015) the user's favorites list in the overlay display area with an edit symbol next to each contact in the favorites list. In some embodiments, selection of the edit symbol next to a particular contact entry in the favorites list allows the user to remove the contact entry. In addition, when in editing mode (i.e., after selecting the edit option), a selection of the contact entry enables the user to modify the information for the contact entry rather than invite the contact to a video conference in some embodiments. Other embodiments allow the user to modify data for a contact entry without selecting the edit option.

The second stage 2110 of FIG. 21 illustrates that upon the user's selection of the selectable UI item 750, the overlay display area 115 displays the user's favorites list with selectable edit items 2140 displayed next to each contact in the favorites list. The selectable edit items 2140 allow the user to choose which particular contact to remove. While displayed as minus signs in this example, the edit items can be displayed differently in different embodiments.

In addition to displaying the list of contacts under the favorites list (as in the favorites list shown in FIG. 7), the overlay display area 115 also displays a selectable UI item 2145. Selection of the selectable UI item 2145 of some embodiments enables the user to cancel the edit operation. In some embodiments, selecting the item 2145 causes the overlay display area 115 to return to displaying the favorites list without the edit items.

In some embodiments, the overlay display area remains superimposed over the video display area when the information displayed in the overlay display area transitions from the basic favorites list (and its associated components, including selectable items) to the favorites list with the edit symbols. In some embodiments, the GUI slides the contact entries of the favorites list towards the right side of the overlay display area so as to allow room for the edit symbols to appear to the left of each contact entry. This transition may be presented in different ways in different embodiments (e.g., as an instantaneous change without animation). Moreover, the animation can be specified by the user (e.g., under a preference setting) in some embodiments.

Returning to FIG. 20, the process 2000 next receives (at 2020) a selection of a particular contact entry from the favorites list in order to remove the contact entry from the favorites list displayed in the overlay display. The selection can be made by selecting the selectable edit item (i.e., the edit symbol) next to the particular contact entry (e.g., through a click operation with a cursor controller, a touchscreen operation, etc.) in some embodiments, through other user interface mechanisms, or through toggling a hardware component coupled to the user's device.

The third stage 2115 of FIG. 21 illustrates that the user is selecting an edit symbol 2155 displayed next to a particular contact entry 2150 (e.g., Beth Joseph's iPhone) that the user wants to remove from the favorites list. In this example, the user selects this particular contact entry 2150 using the cursor 440 by selecting the edit symbol 2155 next to this particular contact entry 2150. However, as mentioned, other selection inputs (e.g., a touchscreen) may be used as well in some embodiments. The user may want to remove a particular contact from the user's favorites list to make the favorites list shorter and more manageable or because the user no longer expects to be in touch with the particular contact on a regular basis. As shown, the GUI 100 indicates the selection by highlighting the contact during the selection. Different embodiments may indicate such a selection in different ways (e.g., by highlighting the border or the text of the item).

The process 2000 then displays (at 2025) a confirmation to delete the particular contact entry whose edit symbol was selected. The confirmation serves as a safety mechanism in making sure that the user actually wants to delete the particular contact entry from the favorites list and has not accidentally selected the contact entry (e.g., through the accidental selection of the wrong contact entry or of the edit option, etc.).

The fourth stage 2120 of FIG. 21 illustrates that the overlay display area 115 now displays a delete confirmation item 2160 next to the selected contact entry 2150. As shown, in some embodiments the overlay display area displays a selectable UI item to enable the user to confirm the deletion of the selected contact entry. As shown in the fourth stage 2120, the selection of the edit symbol 2155 for the particular contact entry 2150 in the third stage 2115 is indicated through an animation of the edit symbol 2155 (i.e., rotated 90°). This animation of the edit symbol 2155 indicates that the particular entry is subject to deletion from the favorites list. This selection can be indicated differently in different embodiments, such as by highlighting the particular contact entry.

Next, the process 2000 receives (at 2030) selection from the user to confirm removal of the particular contact entry from the favorites list. While the confirmation acts as a protection mechanism against accidental removal of a contact entry from the favorites list, some embodiments do not include the confirmation and remove a contact entry as soon as the edit symbol (or a corresponding selectable item) is selected for the entry. In such embodiments, the GUI would proceed directly from the third stage 2115 to the sixth stage 2130. Some embodiments allow the user to specify whether to include a delete confirmation option.

The fifth stage 2125 of FIG. 21 illustrates the selection of the delete confirmation item 2160 displayed next to the contact entry 2150. In this example, the selection is performed using cursor 440 (e.g., with a single click operation). As described above by reference to other selection operations, different embodiments may indicate the selection differently (e.g., by highlighting the item, its border or its text, etc.).

The process 2000 then displays (at 2035) the favorites list in the overlay display with the particular contact entry removed from the list. The process then ends. In the sixth stage 2130 of FIG. 21, the overlay display area 115 now displays the favorites list without the selectable item 2150 for Beth Joseph's iPhone.

V. Software Architecture

Figure 22:
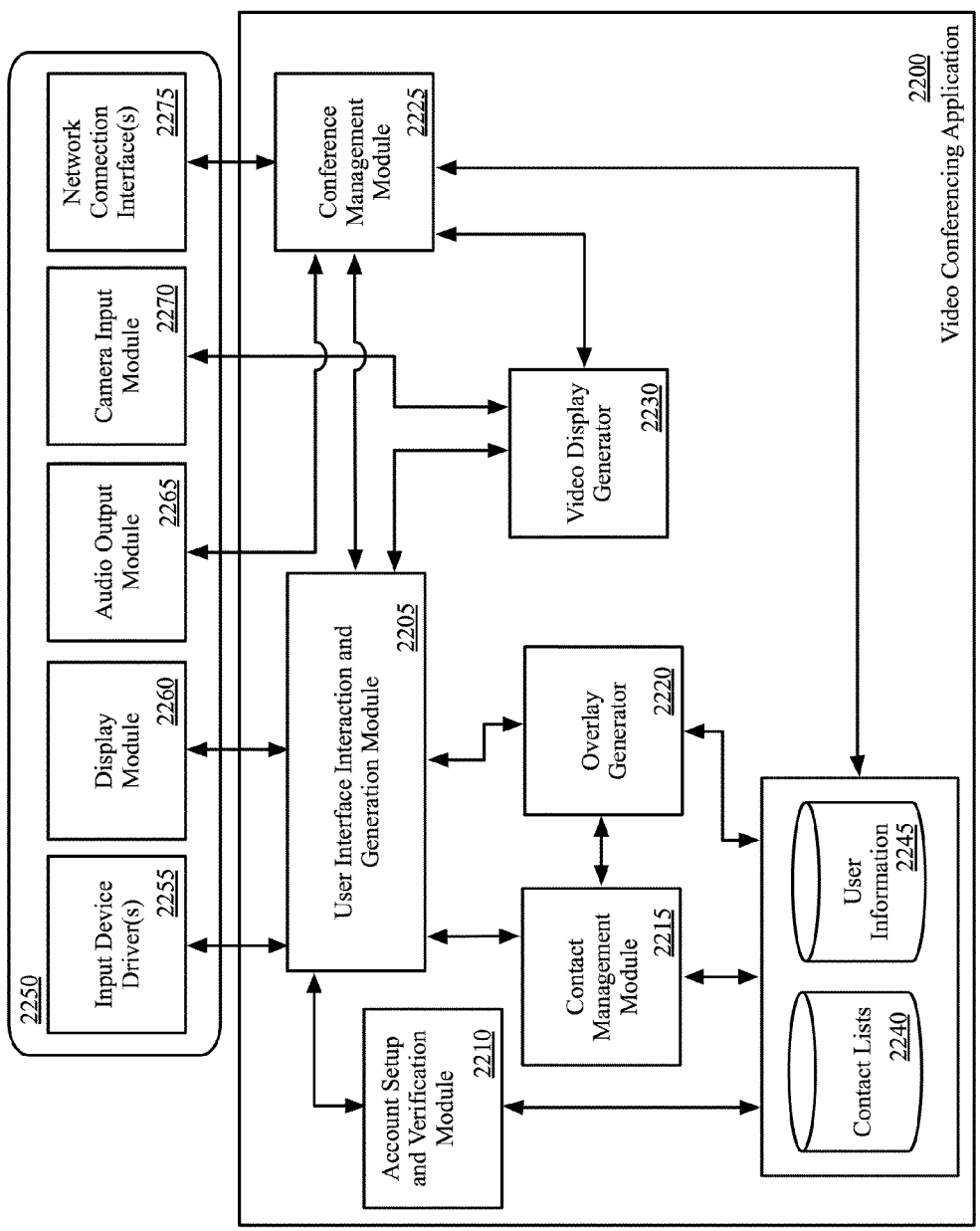
FIG. 22 conceptually illustrates the software architecture of a video conferencing application of some embodiments.

In some embodiments, the processes described above are implemented as software running on a particular machine, such as a computer or a handheld device, or stored in a machine readable medium. FIG. 22 conceptually illustrates the software architecture of a video conferencing application 2200 of some embodiments. In some embodiments, the video conferencing application is a stand-alone application or is integrated into another application (e.g., general communications application), while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The video conferencing application 2200 includes a user interface (UI) interaction and generation module 2205, an account setup and verification module 2210, a contact management module 2215, an overlay generator 2220, a conference management module 2225, and a video display generator 2230. The video conferencing application also includes contact lists 2240 and user information 2245. In some embodiments, the contacts lists 2240 stores the various different contacts lists that a user may use in order to select a contact with whom to have a video conference. This includes the full list of a user's contacts and information about each contact (e.g., their name, phone number, e-mail address, etc.), the recents list, and the favorites list. Some embodiments store a flag for each entry that indicates whether a contact entry is part of the favorites list, rather than storing a separate list. The user information 2245 includes information about each user of the video conferencing application. This may include an account identifier and password, a user profile (e.g., preference settings), as well as references to the list of contacts for the user. In some embodiments, the data 2240 and 2245 is all stored in one physical storage. In other embodiments, the data is stored in separate physical storages and one set of data (e.g., the user information for numerous users) might be spread across more than one physical storage.

FIG. 22 also illustrates an operating system 2250 that includes input device driver(s) 2255, display module 2260, audio output module 2265, camera input module 2270, and network connection interface(s) 2275. In some embodiments, as illustrated, the device drivers 2255, display module 2260, audio output module 2265, camera input module 2270, and network connection interfaces 2275 are part of the operating system 2250 even when the video conferencing application 2200 is an application separate from the operating system.

The input device drivers 2255 may include drivers for translating signals from a keyboard, mouse, touchpad, tablet, touchscreen, etc. A user interacts with one or more of these input device, which send signals to their corresponding device driver. The device driver then translates the signals into user input data that is provided to the UI interaction and generation module 2205.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touchscreen device. In some embodiments, with touch control, a user can directly manipulate objects by interacting with the graphical user interface that is displayed on the display of the touchscreen device. For instance, a user can select a particular object in the graphical user interface by simply touching that particular object on the display of the touchscreen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 2260 translates the output of a user interface for a display device. That is, the display module 2260 receives signals (e.g., from the UI interaction and generation module 2205) describing what should be displayed and translates these signals into pixel information that is sent to the display device. The display device may be an LCD, plasma screen, CRT monitor, touchscreen, etc. The audio output module 2265 translates audio output for an audio device (e.g., one or more speakers). That is, the audio output module 2265 receives signals (e.g., from the conference management module 2225) describing the audio to output and translates these signals into information to send to the speakers.

The camera input module 2270 receives image information from a camera (e.g., RAW images, compressed image data, etc.) and translates this image information for the video conferencing application. The camera input module 2270 may receive data from a camera that is part of the device on which the video conferencing application operates or that is communicatively coupled to the device. The image information may include video images (i.e., a sequence of images taken by the camera at a particular rate, such as 24 images per second).

The network connection interfaces 2275 enable the device on which the video conferencing application 2200 operates to communicate with other devices (e.g., a device of a remote user with which a video conference is held) through one or more networks. The networks may include wireless voice and data networks such as GSM and UMTS, 802.11 networks, wired networks such as ethernet connections, etc.

The UI interaction module 2205 of video conferencing application 2200 interprets the user input data received from the input device drivers and passes it to various modules, including the account setup and verification module 2210, contact management module 2215, overlay generator 2220, conference management module 2225, and video display generator 2230. The UI interaction module also manages the display of the UI, and outputs this display information to the display module 2260. This UI display information may be based on information from the various modules, including the overlay generator 2220 and the video display generator 2230, or directly from input data (e.g., when a user moves an item in the UI that does not affect any of the other modules of the video conferencing application 2200).

The account setup and verification module 2210 manages the setup of user accounts and the verification of those user accounts upon login. A user inputs an account name and password which is passed by the user interface interaction module 2205 to the account setup and verification module 2210. The module 2210 stores the account name and password in the user information 2245. In some embodiments, the password is stored in an encrypted format. The module 2210 then uses this stored information to verify the account name and password at login.

The contact management module 2215 handles the setup, maintenance, and modification of a user's contact lists. In some embodiments, the contact management module 2215 retrieves a user's contacts from an address book associated with an e-mail address of the user. In addition, the contact management module 2215 receives user input to modify contact information or modify the favorites list and then performs these modifications to the contact list data 2240.

The overlay generator 2220 generates the overlay display area of some embodiments. Based on user input received from the UI interaction and generation module 2205, as well as any necessary user profile information (e.g., preference settings), the overlay generator retrieves contact information from storage 2240 and any user information 2245 necessary for generating the display. Once generated, the information describing the overlay display area is sent to the UI interaction and generation module 2205 for incorporation into the GUI.

The conference management module 2225 manages the setup of a video conference as well as the transmission and reception of data associated with the video conference. If requesting a video conference with a remote user, the conference management module 2225 sends out an invitation to the remote user's device. The conference management module 2225 also receives any video conference invitations and sends out a response accepting or declining the invitation based on user response. During the video conference, the module 2225 both (i) receives audio and video data from the remote user and (ii) transmits local audio and video data to the remote user.

The video display generator 2230 generates a video display for the UI interaction and generation module 2205. The video display may be based on both images received from a local camera through camera input module 2270 as well as images received from the remote user through the conference management module 2225. In some embodiments, the video display generator generates a picture-in-picture (PIP) display that is sent to the UI interaction and generation module 2205. In other embodiments, the videos are sent to the UI interaction and generation module 2205 which puts together the PIP display.

While many of the features have been described as being performed by one module (e.g., the contact modification module 2215, the conference management module 2225, etc.), one of ordinary skill in the art will recognize that the functions described herein might be split up into multiple modules. Similarly, functions described as being performed by multiple different modules might be performed by a single module in some embodiments (e.g., the overlay generator 2220 and video display generator 2230 could be part of the UI interaction and generation module 2205).

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs.

Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 23:
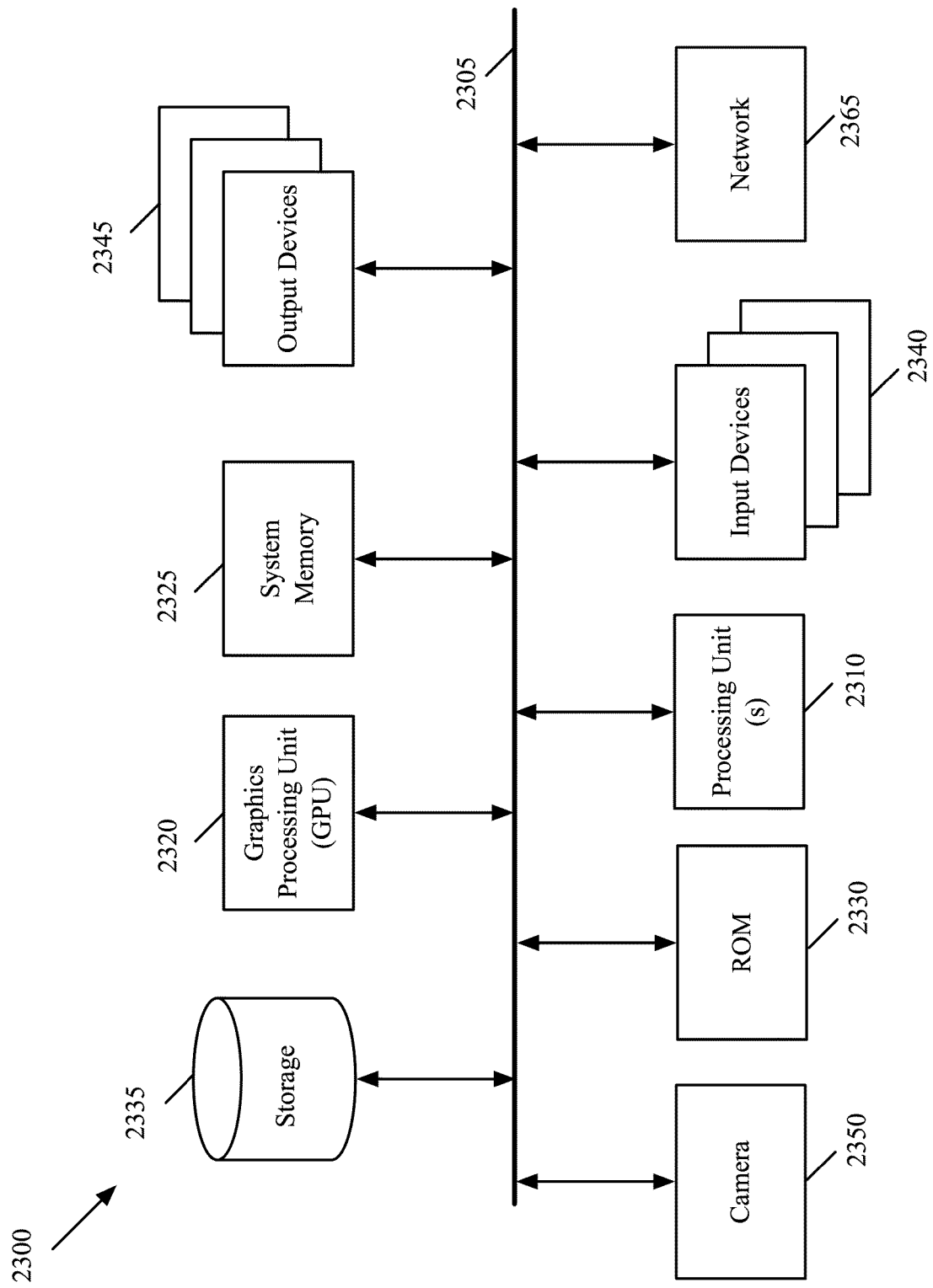
FIG. 23 conceptually illustrates a computer system with which some embodiments of the invention are implemented.

FIG. 23 conceptually illustrates an electronic system 2300 with which some embodiments of the invention are implemented. The electronic system 2300 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2300 includes a bus 2305, processing unit(s) 2310, a graphics processing unit (GPU) 2320, a system memory 2325, a read-only memory 2330, a permanent storage device 2335, input devices 2340, output devices 2345, and camera 2350.

The bus 2305 collectively represents all system, peripheral, and chipset buses that communicatively connect the numerous internal devices of the electronic system 2300. For instance, the bus 2305 communicatively connects the processing unit(s) 2310 with the read-only memory 2330, the GPU 2320, the system memory 2325, and the permanent storage device 2335.

From these various memory units, the processing unit(s) 2310 retrieve instructions to execute and data to process in order to execute the processes of the invention. The processing unit(s) may be a single processor or a multi-core processor in different embodiments. Some instructions are passed to and executed by the GPU 2320. The GPU 2320 can offload various computations or complement the image processing provided by the processing unit(s) 2310. In some embodiments, such functionality can be provided using CoreImage's kernel shading language.

The read-only-memory (ROM) 2330 stores static data and instructions that are needed by the processing unit(s) 2310 and other modules of the electronic system. The permanent storage device 2335, on the other hand, is a read-and-write memory device. This device is a non-volatile memory unit that stores instructions and data even when the electronic system 2300 is off. Some embodiments of the invention use a mass-storage device (such as a magnetic or optical disk and its corresponding disk drive) as the permanent storage device 2335.

Other embodiments use a removable storage device (such as a floppy disk, flash drive, or ZIP® disk, and its corresponding disk drive) as the permanent storage device. Like the permanent storage device 2335, the system memory 2325 is a read-and-write memory device. However, unlike storage device 2335, the system memory is a volatile read-and-write memory, such a random access memory. The system memory stores some of the instructions and data that the processor needs at runtime. In some embodiments, the invention's processes are stored in the system memory 2325, the permanent storage device 2335, and/or the read-only memory 2330. For example, the various memory units include instructions for processing multimedia clips in accordance with some embodiments. From these various memory units, the processing unit(s) 2310 retrieve instructions to execute and data to process in order to execute the processes of some embodiments.

The bus 2305 also connects to the input and output devices 2340 and 2345. The input devices enable the user to communicate information and select commands to the electronic system. The input devices 2340 include alphanumeric keyboards and pointing devices (also called "cursor control devices"). The output devices 2345 display images generated by the electronic system. The output devices include printers and display devices, such as cathode ray tubes (CRT) or liquid crystal displays (LCD). Some embodiments include devices such as a touchscreen that function as both input and output devices.

The camera 2350 captures images (e.g., as RAW image data or compressed image data). The camera 2350 may be integrated into a device with the processing units 2310, etc., or may be a separate device that is communicatively coupled to the device with the processing units.

Finally, as shown in FIG. 23, bus 2305 also couples electronic system 2300 to a network 2365 through a network adapter (not shown). In this manner, the computer can be a part of a network of computers (such as a local area network ("LAN"), a wide area network ("WAN"), or an Intranet, or a network of networks, such as the Internet. Any or all components of electronic system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 5, 18, and 20) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a video conferencing application for execution by a first electronic device, the video conferencing application for conducting a video conference between the first electronic device and a second electronic device, the video conferencing application comprising sets of instructions for:
   in a first display area, presenting a video captured by the first electronic device prior to initiating a video conference;
   in a partially transparent second display area that is superimposed on a portion of the video in the first display area, presenting a set of selectable items representing a set of contacts for the video conferencing application, wherein the portion of the video presented in the first display area remains partially visible under the second display area; and
   upon receiving selection of a particular selectable item in the partially transparent second display area, initiating a video conference with the second electronic device corresponding to a contact represented by the particular selectable item.

2. The non-transitory machine readable medium of claim 1, wherein the first electronic device is a desktop computer.

3. The non-transitory machine readable medium of claim 2, wherein the second electronic device is a desktop computer.

4. The non-transitory machine readable medium of claim 2, wherein the second electronic device is a smartphone.

5. The non-transitory machine readable medium of claim 1, wherein the set of contacts comprises a list of contacts retrieved from an address book of a user of the first electronic device.

6. The non-transitory machine readable medium of claim 1, wherein the set of contacts only includes contacts that are able to participate in a video conference.

7. The non-transitory machine readable medium of claim 6, wherein the set of contacts comprises a list of recent contacts with whom the user most recently participated in a video conference.

8. The non-transitory machine readable medium of claim 1, wherein the set of contacts comprises a list of favorite contacts for a user of the first electronic device.

9. The non-transitory machine readable medium of claim 1, wherein the set of selectable items is a first set, wherein the program further comprises a set of instructions for providing, in the partially transparent second display area, a second set of selectable items for editing information about the set of contacts.

10. The non-transitory machine readable medium of claim 1, wherein the size of the second display area is adjustable through a selection of an edge of the second display area and a subsequent dragging of the selected edge.

11. A method for defining a video conferencing application for conducting a video conference between a first electronic device and a second electronic device, said method comprising:
   providing a video display area for displaying video captured by at least one of the first electronic device and the second electronic device;
   providing a first partially transparent overlay superimposed on a first portion of the video in the video display area, the first transparent overlay comprising a first set of selectable items corresponding to a set of contacts, each selectable item of the set of selectable items for initiating a video conference with a device of the corresponding contact;
   upon initiating a video conference, providing a second partially transparent overlay superimposed on a second portion of the video in the display area, the second transparent overlay comprising a second set of selectable items for configuring the initiated video conference; and
   blurring the first and second portions of the video that are displayed in the video display area and below the transparent overlays such that the blurred portions of the video are partially visible under the transparent overlays.

12. The method of claim 11, wherein the first set of selectable items comprises a selectable item for adding a new contact to the set of contacts.

13. The method of claim 11, wherein the first set of selectable items comprises a selectable item for removing a contact from the set of contacts.

14. The method of claim 11, wherein the second set of selectable items comprises a selectable item for at least one of muting the initiated video conference and ending the initiated video conference.

15. The non-transitory machine readable medium of claim 1, wherein the video conference application further comprises a set of instructions for presenting a user interface (UI) item for adjusting a transparency of the second display area.

16. The non-transitory machine readable medium of claim 1, wherein the second display area is movable, based on user input, to different portions of the video in the first display area.

17. A non-transitory machine readable medium storing a video conferencing application for execution by a first electronic device, the video conferencing application for conducting a video conference between the first electronic device and a second electronic device, the video conferencing application comprising a graphical user interface (GUI), the GUI comprising:
   a video display area for displaying video captured by at least one of the first electronic device and the second electronic device;
   a first partially transparent overlay superimposed on a first portion of the video in the video display area, the first transparent overlay comprising a first set of selectable items corresponding to a set of contacts, each selectable item of the set of selectable items for initiating a video conference with a device of the corresponding contact; and
   a second partially transparent overlay that is superimposed on a second portion of the video in the display area upon initiating a video conference, the second transparent overlay comprising a second set of selectable items for configuring the initiated video conference, wherein the first and second portions of the video that are displayed in the video display area and below the transparent overlays are blurred such that the blurred portions of the video are partially visible under the transparent overlays.

18. The non-transitory machine readable medium of claim 17, wherein the first set of selectable items comprises a selectable item for adding a new contact to the set of contacts.

19. The non-transitory machine readable medium of claim 17, wherein the first set of selectable items comprises a selectable item for removing a contact from the set of contacts.

20. The non-transitory machine readable medium of claim 17, wherein the second set of selectable items comprises a selectable item for at least one of muting the initiated video conference and ending the initiated video conference.

* * * * *